(12) United States Patent
Koizumi

(10) Patent No.: US 10,728,513 B2
(45) Date of Patent: Jul. 28, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tatsuro Koizumi, York (GB)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 16/132,953

(22) Filed: Sep. 17, 2018

(65) Prior Publication Data

US 2019/0098278 A1   Mar. 28, 2019

(30) Foreign Application Priority Data

Sep. 27, 2017   (JP) ................................. 2017-186771

(51) Int. Cl.
*H04N 13/117*   (2018.01)
*H04N 13/282*   (2018.01)
(Continued)

(52) U.S. Cl.
CPC ......... *H04N 13/117* (2018.05); *G06K 9/3241* (2013.01); *G06T 7/337* (2017.01);
(Continued)

(58) Field of Classification Search
None
See application file for complete search history.

(56) References Cited

U.S. PATENT DOCUMENTS 9,465,994 B1 * 10/2016 Mishra ...................... H04N 5/77
10,449,900 B2 * 10/2019 Higuchi ................. H04N 5/247
(Continued)

FOREIGN PATENT DOCUMENTS

JP   5011224 B2   8/2012

OTHER PUBLICATIONS

"Arbitrary Viewpoint Video Synthesis From Multiple Uncalibrated Cameras", by Satoshi Yaguchi & Hideo Saito, IEEE Transactions on Systems, Man, and Cybernetics—Part B: Cybernetics, vol. 34, No. 1, pp. 430-439, Feb. 2004. (Year: 2004).*
(Continued)

*Primary Examiner* — James A Thompson
(74) *Attorney, Agent, or Firm* — Carter, DeLuca & Farrell LLP

(57) ABSTRACT

An image processing apparatus includes: an image obtaining unit configured to obtain images of an image capturing target area from a plurality of directions; an information obtaining unit configured to obtain viewpoint information; a determination unit configured to determine a pixel value of a particular area in a virtual viewpoint image according to a virtual viewpoint at a first time indicated by the viewpoint information, based on a pixel value of an obtained image based on image capturing by a first image capturing apparatus at a second time, and a pixel value of an obtained image based on image capturing by a second image capturing apparatus at the first time, wherein the particular area is not captured by the first image capturing apparatus at the first time; and a generation unit configured to generate a virtual viewpoint image in accordance with the determination of the pixel value.

15 Claims, 18 Drawing Sheets

(51) Int. Cl.
*H04N 5/247* (2006.01)
*H04N 13/243* (2018.01)
*H04N 13/111* (2018.01)
*G06K 9/32* (2006.01)
*H04N 5/232* (2006.01)
*G06T 7/73* (2017.01)
*G06T 7/33* (2017.01)

(52) U.S. Cl.
CPC ........... *G06T 7/74* (2017.01); *H04N 5/23229* (2013.01); *H04N 5/247* (2013.01); *H04N 13/111* (2018.05); *H04N 13/243* (2018.05); *H04N 13/282* (2018.05); *G06T 2207/30244* (2013.01)

(56) References Cited

U.S. PATENT DOCUMENTS

| | | | | |
|---|---|---|---|---|
| 2003/0011597 | A1* | 1/2003 | Oizumi | G06T 15/20 345/427 |
| 2007/0003162 | A1* | 1/2007 | Miyoshi | G08G 1/167 382/276 |
| 2012/0092342 | A1* | 4/2012 | Suzuki | G06T 15/04 345/420 |
| 2018/0063499 | A1 | 3/2018 | Koizumi | |
| 2018/0180733 | A1* | 6/2018 | Smits | G01S 17/931 |
| 2018/0350136 | A1* | 12/2018 | Rowley | G06F 3/012 |
| 2018/0376079 | A1* | 12/2018 | Shigemura | H04N 5/2625 |
| 2019/0052800 | A1* | 2/2019 | Govindarao | H04N 5/23222 |

OTHER PUBLICATIONS

"A Method for Generating and Displaying a Free View 3D Image", by Fei Gu, Takayuki Nakata, & Tue Bao, SICE Annual Conference 2011, pp. 277-282, Sep. 2011. (Year: 2011).*

* cited by examiner

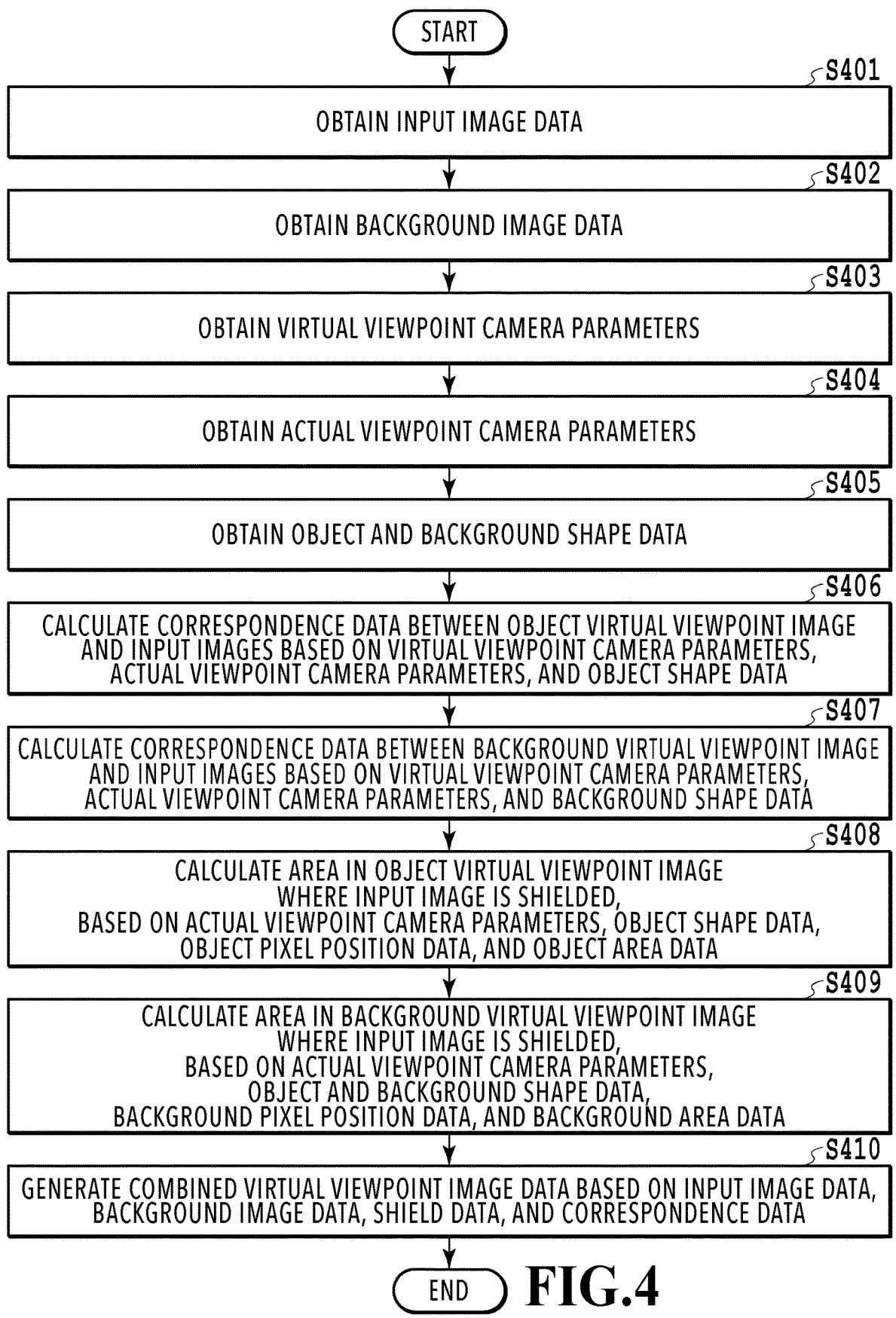

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium for generating a combined virtual viewpoint image from a multi-viewpoint image.

Description of the Related Art

A technique has been known which reconstructs a virtual viewpoint image of an object viewed from a desired virtual viewpoint from a multi-viewpoint image obtained by capturing images of the object from different viewpoints with a plurality of image capturing apparatuses. Japanese Patent No. 5011224 discloses the following method. Firstly, a three-dimensional model of an object is generated using captured images of the object captured by a plurality of image capturing apparatuses and position information on the image capturing apparatuses. Secondly, a texture image for each position on the three-dimensional model is generated by blending texture images on the plurality of captured images. Lastly, the blended texture images are texture-mapped to the three-dimensional model to thereby generate an image from a virtual viewpoint, at which no image capturing apparatus is disposed. The thus generated image from a desired viewpoint where no image capturing apparatus is disposed will be referred to as "virtual viewpoint image".

Meanwhile, due to the influence of lighting and the like and the individual difference between the image capturing apparatuses, even the same part of an object may sometimes appear differently in color on captured images obtained by the image capturing apparatuses. For this reason, in a case of generating a virtual viewpoint image by using images captured by a plurality of image capturing apparatuses, unnatural changes in color sometimes appear around the boundary between a plurality of areas that are textured-mapped using images captured by different image capturing apparatuses, thereby causing visual oddness.

SUMMARY OF THE INVENTION

An image processing apparatus comprises: an image obtaining unit configured to obtain images based on image capturing by a plurality of image capturing apparatuses that capture images of an image capturing target area from a plurality of directions; an information obtaining unit configured to obtain viewpoint information indicating a virtual viewpoint; a determination unit configured to determine a pixel value of a particular area in a virtual viewpoint image according to the virtual viewpoint at a first time indicated by the viewpoint information, based on a pixel value of an obtained image based on image capturing by a first image capturing apparatus among the plurality of image capturing apparatuses at a second time, which is different from the first time, and a pixel value of an obtained image based on image capturing by a second image capturing apparatus among the plurality of image capturing apparatuses, which is different from the first image capturing apparatus, at the first time, wherein the particular area is not captured by the first image capturing apparatus at the first time; and a generation unit configured to generate a virtual viewpoint image in accordance with the determination of the pixel value by the determination unit.

Further features of the present invention will become apparent from the following description of exemplary embodiments with reference to the attached drawings.

BRIEF DESCRIPTION OF THE DRAWINGS

FIG. 4 is a flowchart illustrating an example of the flow of processing by the image processing apparatus;

DESCRIPTION OF THE EMBODIMENTS

Embodiments of the present invention will be described below with reference to the drawings. However, the constituent components described in these embodiments are mere examples and are not intended to limit the scope of the present invention to those. Also, not all the combinations of the constituent components described in the embodiments are necessarily essential for the solution to the problem.

Embodiment 1

<Overall Configuration of Image Capturing System>

Figure 1:
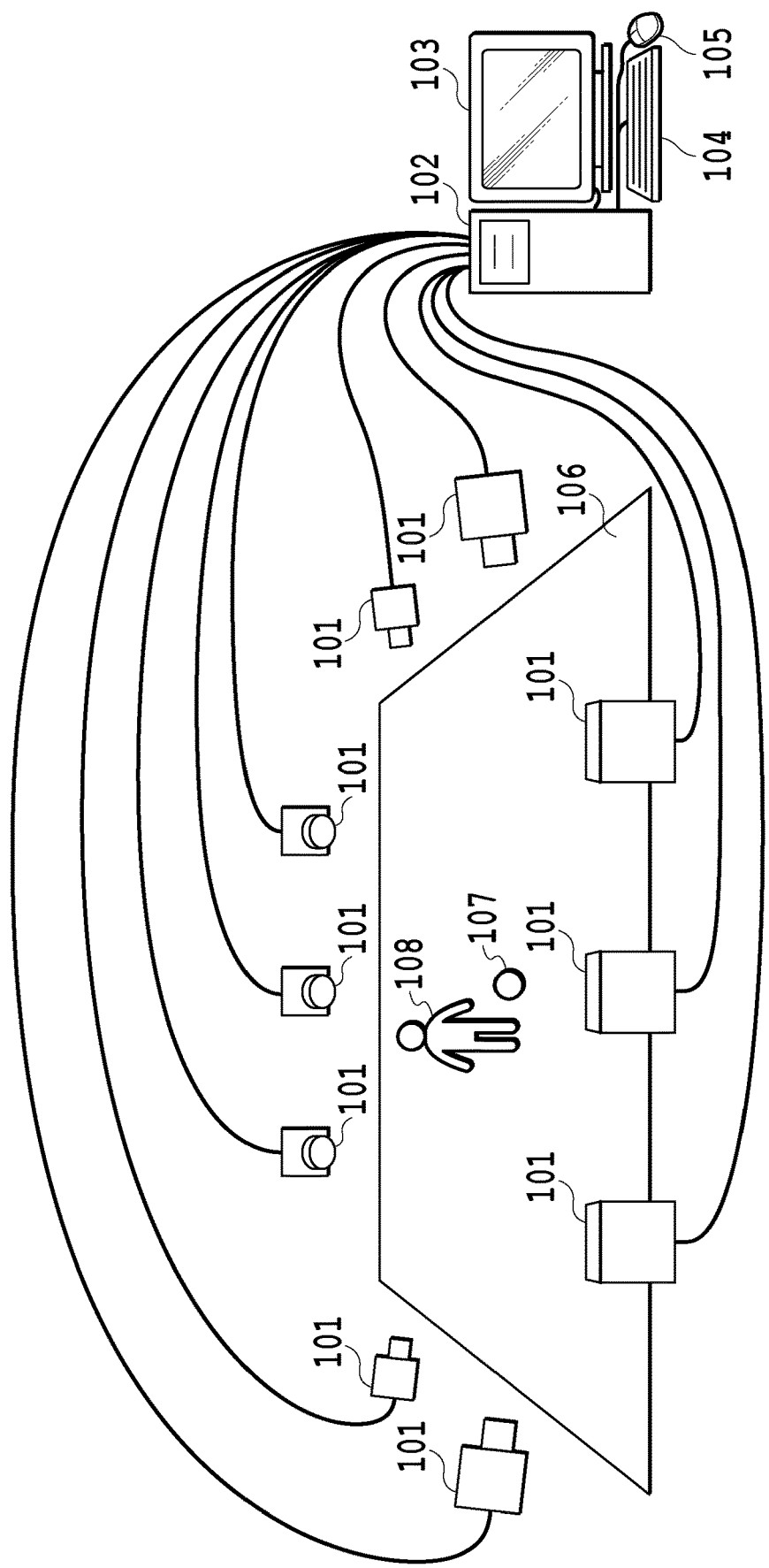
FIG. 1 is a schematic diagram illustrating an example of an image capturing system including an image processing apparatus according to embodiment.

FIG. 1 is a schematic diagram illustrating an example of an image capturing system including an image processing apparatus in embodiment 1. The image capturing system includes a plurality (10 in the illustrated example) of image capturing apparatuses 101 and an image processing apparatus 102. The image processing apparatus 102 includes a display apparatus 103, an input apparatus (keyboard) 104, and an input apparatus (mouse) 105. The plurality of image capturing apparatuses 101 are placed in such an arrangement as to surround objects 106 to 108 and capture images of the objects 106 to 108 from the surrounding positions. In other words, the plurality of image capturing apparatuses 101 are disposed so as to be capable of capturing images of an image capturing target area covering the objects 106 to 108 from viewpoints in a plurality of different directions. The image processing apparatus 102 uses pieces of image data captured by the plurality of image capturing apparatuses 101 to generate a combined, reconstructed image from a virtual viewpoint (hereinafter, referred to as "viewpoint image").

A captured image will be referred to as "input image data". Also, in this system, foreground objects (moving bodies) that are particular moving objects, such as the object 107 (player) and the object 108 (ball), and background objects (stationary bodies) that do not move, such as the object 106 (ground), are handed in distinction from each other. An image in which only the stationary object 106 is captured, obtained by image capturing or combining by the image processing apparatus 102 performed in advance, will be referred to as "background image data". Background image data is captured while the particular objects are not present, for example. In this system, virtual viewpoint image data is generated from input image data and background image data. The viewpoints of the input image data and the background image data will be referred to as "actual viewpoints". The viewpoint of the virtual viewpoint image data will be referred to as "virtual viewpoint".

Also, the display apparatus 103 and the input apparatuses 104, 105 are connected to the image processing apparatus 102. The user operates the image processing apparatus 102 through the display apparatus 103 and the input apparatuses 104, 105 to set a virtual viewpoint, set image capturing conditions, and check the result of processing on pieces of image data obtained by the image capturing.

Figure 2:
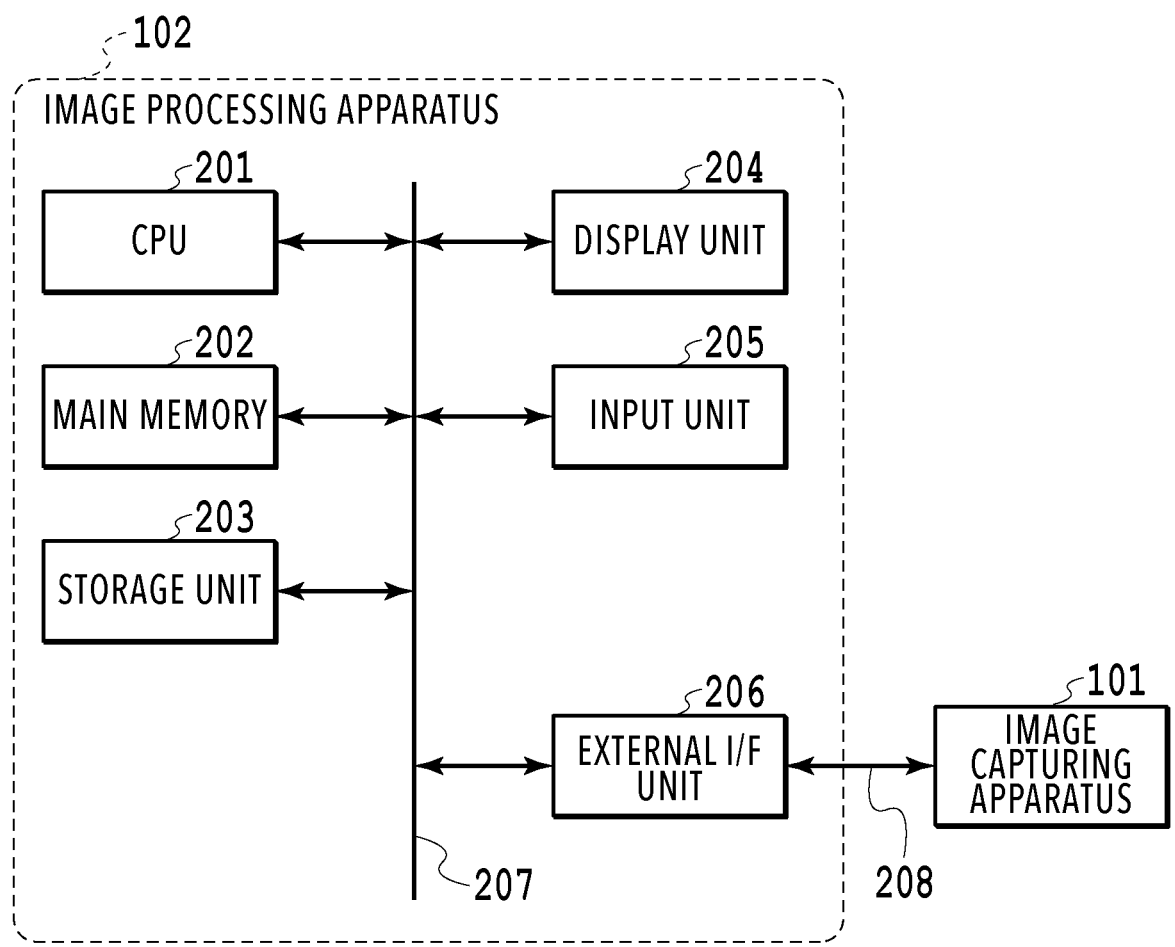
FIG. 2 is a block diagram illustrating an example of the hardware configuration of the image processing apparatus.

FIG. 2 is a diagram illustrating an example of the hardware configuration of the image processing apparatus.

The image processing apparatus 102 includes a CPU 201, a main memory 202, and a storage unit 203. The image processing apparatus 102 includes a display unit 204, an input unit 205, and an external interface (hereinafter, described as "external I/F") unit 206. These functional units are connected to each other through a bus 207. The external I/F unit 206 is connected to the plurality of image capturing apparatuses 101 through an LAN 208.

The storage unit 203 stores a control program for implementing the processing by the image processing apparatus 102 illustrated in flowcharts of FIGS. 4, 8, 10, 12, 14, and 16 to be described later, data to be used in executing the control program, and so on. The control program and the data are taken into the main memory 202 through the bus 207 under control of the CPU 201. With these executed by the CPU 201, the above-mentioned functions are implemented in cooperation with the above-mentioned hardware. For example, the display unit 204 functions as the display apparatus 103 and the input unit 205 functions the input apparatus (keyboard) 104 and the input apparatus (mouse) 105. Also, the processing by the image processing apparatus 102 is implemented by this cooperation of the software and the hardware.

<Software Configuration of Image Processing Apparatus and Flow of its Processing>

Figure 3:
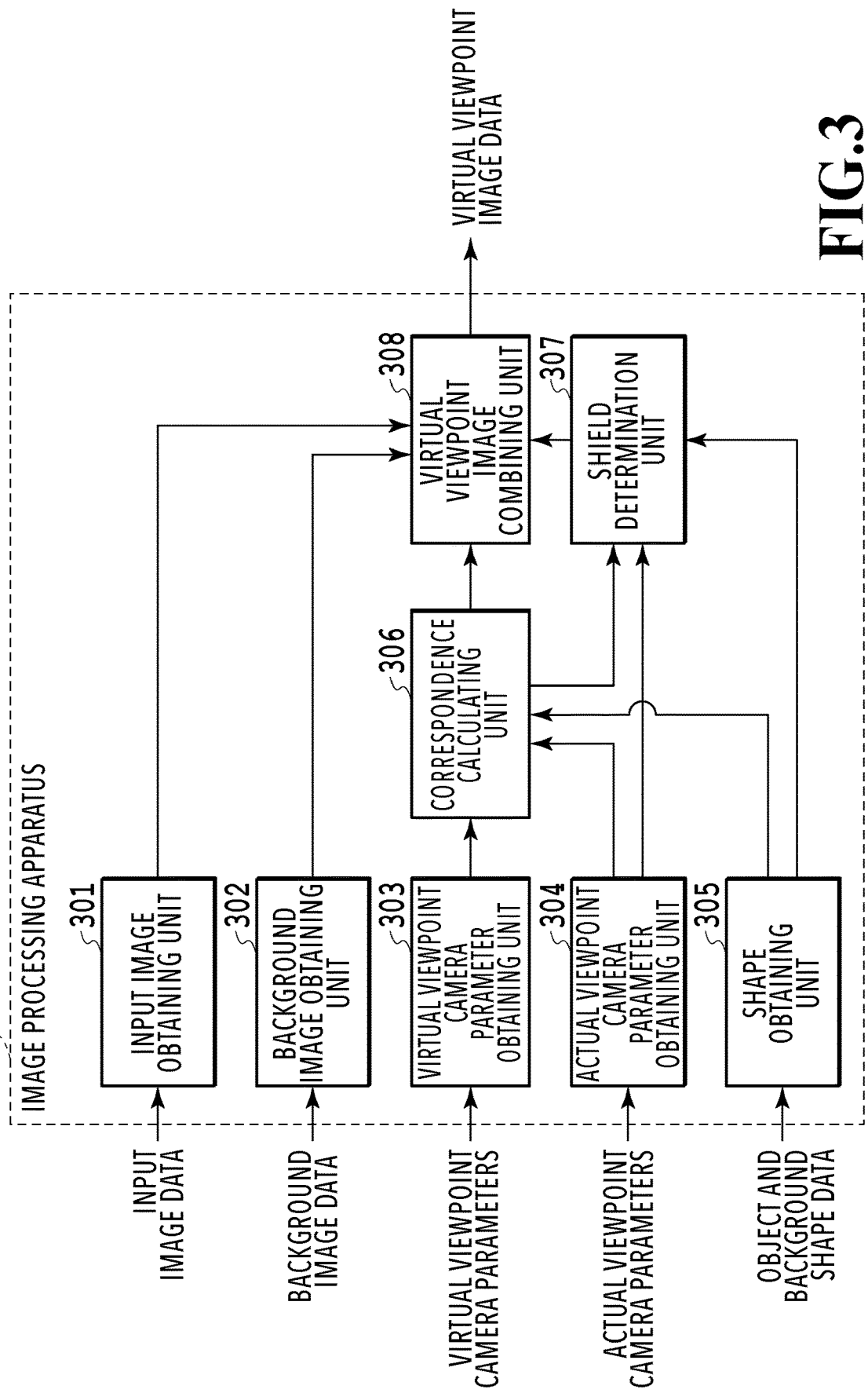
FIG. 3 is a block diagram illustrating an example of the software configuration of the image processing apparatus.

FIG. 3 is a block diagram illustrating an example of the software configuration of the image processing apparatus 102.

The image processing apparatus 102 includes an input image obtaining unit 301, a background image obtaining unit 302, a virtual viewpoint camera parameter obtaining unit 303, an actual viewpoint camera parameter obtaining unit 304, and a shape obtaining unit 305. The image processing apparatus 102 also includes a correspondence calculating unit 306, a shield determination unit 307, and a virtual viewpoint image combining unit 308.

The input image obtaining unit 301 obtains input image data. As the input image data, used are image data captured by the plurality of image capturing apparatuses 101 and transferred to and stored in the main memory 202 of the image processing apparatus 102. Also, development processing, color processing, distortion correction, and so on are performed in advance.

The background image obtaining unit 302 obtains background image data. As the background image data, used are image data captured by the image capturing apparatuses 101 with no moving object present, and transferred to and stored in the main memory 202 of the image processing apparatus 102. Alternatively, the background image data may be generated in advance by applying a time-series filter to input image data. In this embodiment, data on a moving object will be denoted by a data name with the term "object" given at the beginning, and data on a stationary object will be denoted by a data name with the term "background" given at the beginning.

The virtual viewpoint camera parameter obtaining unit 303 obtains virtual viewpoint camera parameters. The virtual viewpoint camera parameters are an example of viewpoint information indicating a virtual viewpoint and, in this embodiment, are intrinsic parameters and extrinsic parameters of the virtual viewpoint. Examples of the intrinsic parameters of the virtual viewpoint include the focal length, the image center position, and so on. Examples of the extrinsic parameters of the virtual viewpoint include the camera position and the camera orientation. As the virtual viewpoint is designated on the display apparatus 103 by operation of the input apparatuses 104, 105 by the user of the image processing apparatus 102, virtual viewpoint camera parameters are generated based on that virtual viewpoint. The virtual viewpoint camera parameters generated based on the virtual viewpoint are stored in the main memory 202 of the image processing apparatus 102.

The actual viewpoint camera parameter obtaining unit 304 obtains actual viewpoint camera parameters. The actual viewpoint camera parameters are intrinsic parameters (focal length, image center position) and extrinsic parameters (camera position, camera orientation) of the actual viewpoints and are measured and stored in the main memory 202 of the image processing apparatus 102 in advance.

The shape obtaining unit 305 obtains object and background shape data. The background shape data is measured and generated in advance and stored in the main memory 202 of the image processing apparatus 102. The object shape data is generated in advance based on input image data by a method such as silhouette volume intersection or multi-view stereo and stored in the main memory 202 of the image processing apparatus 102. The shape data may be in any form such as polygons, point groups, a distance map, or the like.

The correspondence calculating unit 306 calculates correspondence data between the virtual viewpoint image and the input images based on the virtual viewpoint camera parameters, the actual viewpoint camera parameters, and the object and background shape data. Specifically, the correspondence calculating unit 306 calculates pixel position data, optical line angle data, and area data, each of which is correspondence data. Each type of data is calculated for each of the object and the background. The pixel position data is data storing the pixel positions of each actual viewpoint corresponding to the pixels of the virtual viewpoint image data. The optical line angle data is data indicating the angle formed between an optical line of the virtual viewpoint and an optical line of each actual viewpoint. The area data is data indicating an area in which to perform a drawing process and storing information indicating, for each pixel of the virtual viewpoint image data, whether the object or the background is present on the optical line passing through the pixel of interest. Details will be described later.

The shield determination unit 307 calculates shield data based on the actual viewpoint camera parameters, the object and background shape data, and the pixel position data and area data, calculated by the correspondence calculating unit 306. The shield data is data storing information indicating, for each pixel of the virtual viewpoint image data, whether the point on the object or the background seen at the pixel of interest is seen from the actual viewpoints. Details will be described later.

The virtual viewpoint image combining unit 308 generates the virtual viewpoint image data based on the input image data, the background image data, the object and background pixel position data, the object and background optical line angle data, the object and background area data, and the object and background shield data. Details will be described later.

FIG. 4 is a flowchart illustrating an example of the flow of the processing by the image processing apparatus 102. Note that in the following, the symbol S means a step in the flowchart.

In S401, the input image obtaining unit 301 obtains input image data captured by the plurality of image capturing apparatuses 101 and stored in the main memory 202.

In S402, the background image obtaining unit 302 obtains background image data captured by the plurality of image capturing apparatuses 101 and stored in advance in the main memory 202.

In S403, the virtual viewpoint camera parameter obtaining unit 303 obtains virtual viewpoint camera parameters generated based on designation of a virtual viewpoint by the user and stored in the main memory 202.

In S404, the actual viewpoint camera parameter obtaining unit 304 obtains actual viewpoint camera parameters stored in the main memory 202.

In S405, the shape obtaining unit 305 obtains object and background shape data stored in the main memory 202.

In S406, the correspondence calculating unit 306 calculates correspondence data between the object virtual viewpoint image and input images based on the virtual viewpoint camera parameters, the actual viewpoint camera parameters, and the object shape data. The correspondence calculating unit 306 calculates object pixel position data, object optical line angle data, and object area data as the correspondence data between the object images.

In S407, the correspondence calculating unit 306 calculates correspondence data between the background virtual viewpoint image and input images based on the virtual viewpoint camera parameters, the actual viewpoint camera parameters, and the background shape data. The correspondence calculating unit 306 calculates background pixel position data, background optical line angle data, and background area data as the correspondence data between the background images.

In S408, the shield determination unit 307 calculates object shield data indicating the area in the object virtual viewpoint image where the input image is shielded, based on the actual viewpoint camera parameters, the object shape data, the object pixel position data, and the object area data.

In S409, the shield determination unit 307 calculates background shield data indicating the area in the background virtual viewpoint image where the input image is shielded, based on the actual viewpoint camera parameters, the object and background shape data, the background pixel position data, and the background area data.

In S410, the virtual viewpoint image combining unit 308 generates virtual viewpoint image data based on the input image data, the background image data, the object and background pixel position data, the object and background optical line angle data, the object and background area data, and the object and background shield data.

Overview of Problem and Solution

Figure 5A:
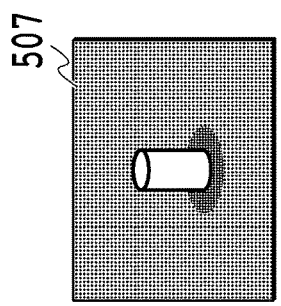
FIG. 5A and FIG. 5B are diagrams for explaining a problem caused by a shielded area.

Here, a problem caused at a shielded area will be described using FIG. 5A and FIG. 5B. FIG. 5A is a diagram illustrating how input image data is obtained. Description will be given here of an example of obtaining input image data 506 and input image data 507 from two actual viewpoints 504, 505 having different optical lines. The actual viewpoints 504, 505 are disposed to face each other with an image capturing target object 501 situated therebetween in a plan view. The object 501 is such an object that a shadow 502 of the object 501 appears on a background 503. The object 501 is a cylindrical object (moving body) while the background 503 is a flat object (stationary body) on which the object 501 is placed. The input image data 506, obtained by image capturing from the actual viewpoint 504, and the input image data 507, obtained by image capturing from the actual viewpoint 505, are pieces of image data differing from each other in brightness and color due to the individual difference between the image capturing apparatuses and the visual difference between the viewpoints.

Figure 5B:
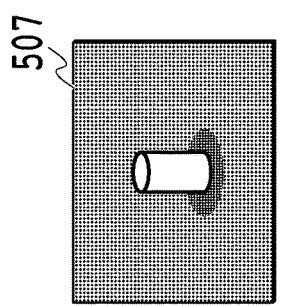

FIG. 5B is an explanatory diagram of virtual viewpoint image data obtained by combining two pieces of input image data. A virtual viewpoint 509 is a viewpoint having a different optical line from those of the actual viewpoints 504 and 505 and disposed at a position closer to the actual viewpoint 504 than to the actual viewpoint 505. Virtual viewpoint image data 510 from the virtual viewpoint 509 is generated by transforming the input image data 506 and the input image data 507 based on the shape data of each of the object 501 and the background 503. Here, the input image data 506, captured from the actual viewpoint 504, which is closer to the virtual viewpoint 509, is preferentially used in the image generation in order to reflect the visual difference between the viewpoints. The input image data 507, captured from the actual viewpoint 505, is used for an area 508 in the background 503 shielded by the object 501 as viewed from the actual viewpoint 504. Specifically, the input image data 506 and the input image data 507 are united with each other while the area where the object 501 appears is removed.

However, the input image data 506 and the input image data 507 differ from each other in brightness and color. Thus, in the virtual viewpoint image data 510, obtained by combining the input image data 506 and the input image data 507, there are unnatural changes in color between the area corresponding to the shielded area 508 and the area corresponding to the other part of the background 503. This causes visual oddness.

Next, a solution to the problem in this embodiment will be described using FIG. 6A to FIG. 6D. In this embodiment, the background, the shadow, and the object are each transformed for the virtual viewpoint and then combined with the others to generate virtual viewpoint image data.

Here, input image data and background image data from the n-th actual viewpoint among the plurality of actual viewpoints will be denoted as $I_n$ and $B_n$, respectively. n is a natural number larger than or equal to 2. Also, background transform without the shielding by the object taken into consideration will be denoted as $T_b$. Background transform with the shielding by the object taken into consideration will be denoted as $T_o$. Further, object transform with the shielding by the object taken into consideration will be denoted as $T_f$. Here, the background transform with the shielding by the object taken into consideration is transform as described above using FIG. 5B and is a process of transforming pieces of image data from actual viewpoints into image data from a virtual viewpoint based on the shape of the background by merging the pieces of image data from the actual viewpoints while removing the area where the object is projected. Here, it does not matter what is in the image data from each actual viewpoint. This transform is defined by the shapes of the object and background provided. Also, the background transform without the shielding by the object taken into consideration is a process of transforming image data from an actual viewpoint into image data from a virtual viewpoint based on the shape of the background without particularly doing anything on the area where the object is projected. Also, the object transform with the shielding by the object taken into consideration is a process of generating virtual viewpoint image data of the area corresponding to the object from image data from an actual viewpoint, and any method may be employed.

Figure 6C:
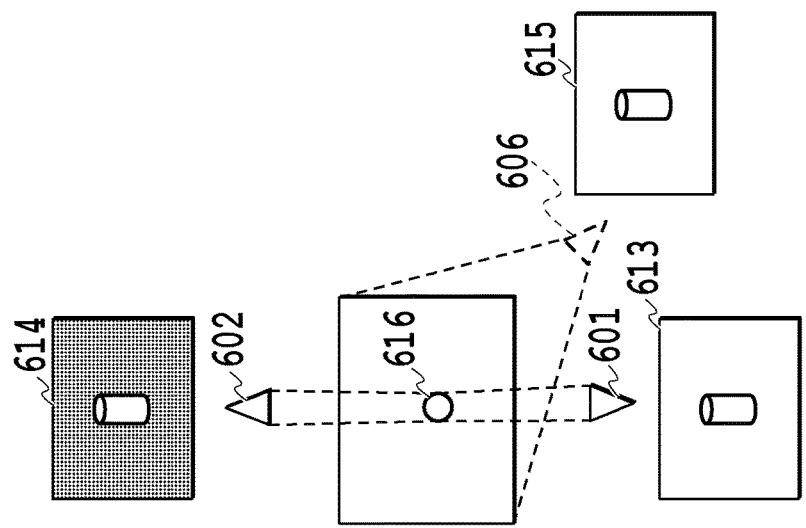
FIG. 6A to FIG. 6D are diagrams for explaining a solution to the problem caused by a shielded area.
Figure 6B:
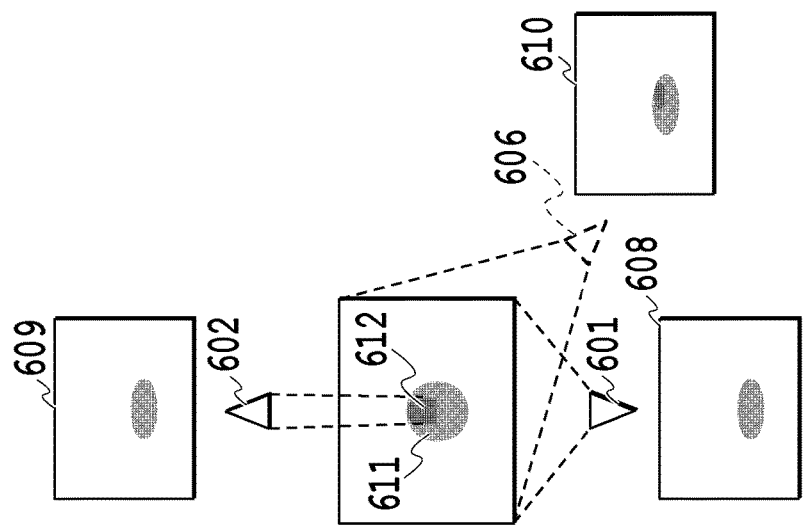
Figure 6A:
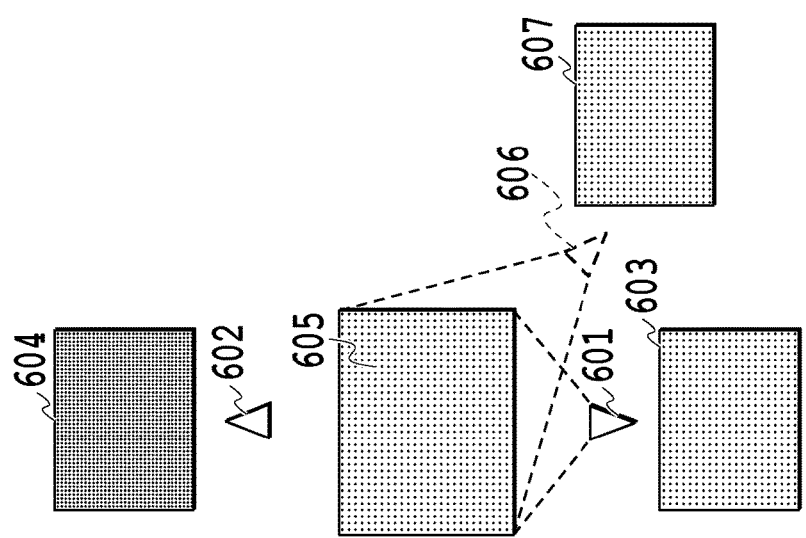

FIG. 6A is a diagram for explaining a process of generating $T_b(B_n)$ in which the background transform $T_b$ without the shielding by the object taken into consideration is applied to background image data B. Specifically, the transform $T_b$ without the shielding by the object taken into consideration is applied to background image data 603 obtained by capturing an image of an object 605 with no moving object present thereon from an actual viewpoint 601, to thereby generate background transformed image data 607. Background image data 604 is image data obtained by capturing an image of the object 605 with no moving object present thereon from an actual viewpoint 602.

FIG. 6B is a diagram for explaining a process of generating $T_o(I_n-B_n)$ in which the background transform $T_o$ with the shielding by the object taken into consideration is applied to difference image data $I_n-B_o$ obtained by subtracting the background image data $B_n$ from input image data $I_n$. This image data corresponds to the shadow component. Specifically, the background transform $T_o$ with the shielding by the object taken into consideration is applied to difference image data 608, 609 obtained by subtracting the background image data 603, 604 from the input image data 506, 507, obtained by capturing images the object from the actual viewpoint 601, 602 and stored in the main memory. Then, shadow transformed image data 610 is generated. The difference between the object 501 and the background 503 appears also in the difference image data 608, 609. However, this area is identified based on the object shape data and prevented from appearing in the shadow transformed image data 610.

FIG. 6C is a diagram for explaining a process of generating $T_f(I_n)$ in which the object transform $T_f$ for the virtual viewpoint is applied to the input image data $I_n$. Specifically, the object transform $T_f$ with the shielding by the object taken into consideration is applied to input image data obtained by capturing an object 616 from the actual viewpoint 601, 602 and stored in the main memory to thereby generate object transformed image data 615.

Figure 6D:
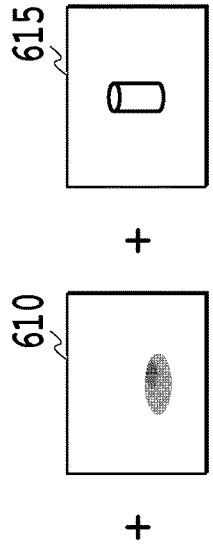

FIG. 6D is a diagram for explaining a process of generating virtual viewpoint image data $T_b(B_o)+T_o(I_n-B_n)+M_f T_f(I_n)$ from these pieces of transformed image data. Specifically, the background transformed image data 607, the shadow transformed image data 610, and the object transformed image data 615 are combined to generate virtual viewpoint image data 617. Here, $M_f$ denotes area data indicating the region in the virtual viewpoint image data occupied by the object. The virtual viewpoint image data 617, generated by the above method, is a virtual viewpoint image according to the virtual viewpoint at a particular time when a predetermined object (a person, a ball, etc.) is situated within the image capturing ranges of the image capturing apparatus with the actual viewpoint 601 and the image capturing apparatus with the actual viewpoint 602. Further, the pixel value of a particular area in the virtual viewpoint image data 617 that cannot be captured by the image capturing apparatus with the actual viewpoint 601 (shielded by the object) at the above particular time are determined based on the pixel value of the background transformed image data 607 and the pixel value of the shadow transformed image data 610. Here, the background transformed image data 607 is image data based on image capturing by the image capturing apparatus with the actual viewpoint 601 at a different time when the predetermined object is not situated within the image capturing range. Also, the shadow transformed image data 610 is image data generated based on: the input image data 507, based on image capturing by the image capturing apparatus with the actual viewpoint 602 at the above particular time; and the background image data 604, based on image capturing by the image capturing apparatus with the actual viewpoint 602 at a different time when the predetermined object is not situated within the image capturing range.

In the above, the image capturing apparatus with the actual viewpoint 601 and the image capturing apparatus with the actual viewpoint 602 are selected as the image capturing apparatuses that obtain the images to be used to generate a virtual viewpoint image from a virtual viewpoint 606. Here, for example, the actual viewpoint 601 is selected as the closest actual viewpoint to the virtual viewpoint 606 or the like based on the viewpoint information indicating the virtual viewpoint 606. On the other hand, the actual viewpoint 602 is selected as an actual viewpoint at a position from which the area shielded by the predetermined object as viewed from the actual viewpoint 601 can be captured or the like based on the position of the actual viewpoint 601 and the position of the predetermined object. Note that this method of selecting the actual viewpoints is one example, and this embodiment is not limited to this.

Unnatural changes in color will occur in the background area of virtual viewpoint image data in a case where pieces of input image data from different viewpoints, which are visually different from each other, are transformed for the virtual viewpoint by being united with the shielding by the object taken into consideration. With difference image data obtained by subtracting background image data from input image data both taken from the same actual viewpoint, the brightness and color bias unique to the viewpoint are removed by the subtraction. For this reason, unnatural changes in color will occur less even if the difference image data is united with the shielding taken into consideration. Also, unnatural changes in color do not occur in the virtual viewpoint image data generated from background image data since the uniting due to the shielding by the object is not performed. Thus, by combining image data obtained by transforming difference image data for the virtual viewpoint with the shielding by the object taken into consideration and image data obtained by transforming background image data for the virtual viewpoint, it is possible to generate virtual viewpoint image data of the background area including the shadow while suppressing unnatural changes in color. By superimposing virtual viewpoint image data of the object area onto this, virtual viewpoint image data without oddness is generated.

<Configuration of Correspondence Calculating Unit and Flow of its Processing>

Figure 7:
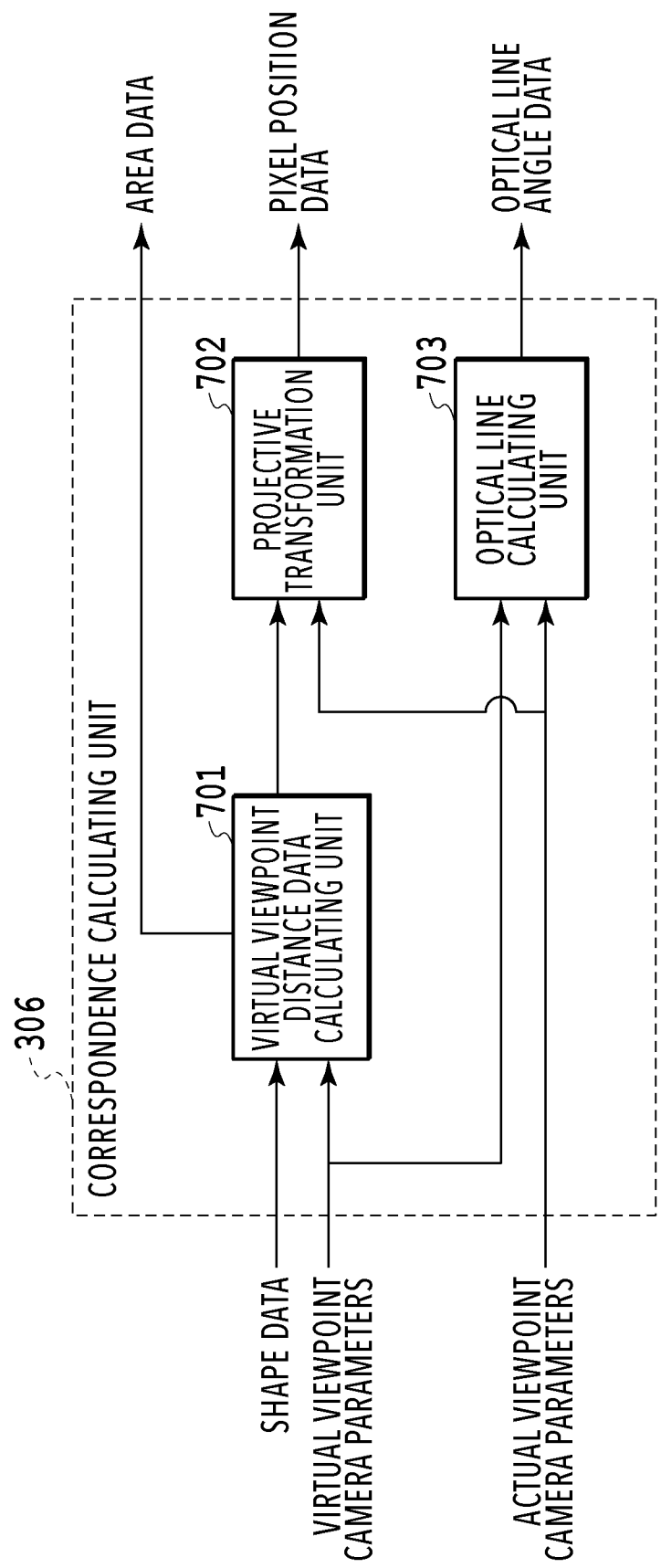
FIG. 7 is a block diagram illustrating an example of the configuration of a correspondence calculating unit of the image processing apparatus.

FIG. 7 is a block diagram illustrating an example of the configuration of the correspondence calculating unit 306.

The correspondence calculating unit 306 includes a virtual viewpoint distance data calculating unit 701, a projective transformation unit 702, and an optical line calculating unit 703.

The virtual viewpoint distance data calculating unit 701 calculates area data and distance data based on the virtual viewpoint camera parameters and the shape data. The distance data is data obtained by calculating the distance to the object or the background for each pixel of the virtual viewpoint image data, and is calculated from the shape data, which is point groups, polygons, or the like, by using a Z-buffer method or the like. Also, the area data is data obtained by calculating whether the distance data is infinity for each pixel of the virtual viewpoint image data, that is, whether any object or the background is present on the optical line passing through the pixel. Note that the virtual viewpoint distance data calculating unit 701 may not necessarily have to use explicit shape data for the calculation of the distance data but may be configured to calculate and obtain distance data as necessary.

The projective transformation unit 702 calculates pixel position data based on the distance data and the actual viewpoint camera parameters. The pixel position data is data storing pixel positions of each actual viewpoint corresponding to the pixels of the virtual viewpoint image data. Here, a method of calculating the pixel positions of a virtual viewpoint corresponding to an actual viewpoint will be described. The distance of a pixel of interest (u', v') is d'. An intrinsic parameter matrix of the virtual viewpoint is A', and an extrinsic parameter matrix of the virtual viewpoint is [R' T']. An intrinsic parameter matrix of the n-th actual viewpoint is $A_n$, and an extrinsic parameter matrix of the n-th actual viewpoint is [$R_n$ $T_n$]. A pixel position (u, v) of the virtual viewpoint corresponding to the n-th actual viewpoint is calculated from equation 1. R' and $R_n$ represent rotation matrices. T' and $T_n$ represent translation vectors.

$$\lambda \begin{pmatrix} u \\ v \\ 1 \end{pmatrix} = A_n R_n \left( d' R'^t A'^{-1} \begin{pmatrix} u' \\ v' \\ 1 \end{pmatrix} - R'^t T' \right) + A_n T_n \quad (1)$$

The optical line calculating unit 703 calculates optical line angle data indicating the angle formed between an optical line of the virtual viewpoint and an optical line of each actual viewpoint, based on the virtual viewpoint camera parameters and the actual viewpoint camera parameters. Here, the optical line calculating unit 703 calculates the angle formed between the optical line of the virtual viewpoint and the optical line of each actual viewpoint, by calculating the angle between vectors obtained by projecting the directions of the views from these viewpoints onto the plane on which the image capturing apparatuses are placed and normalizing the projections. In this case, the optical line angle data is the same for all pixels for the object and the background. However, optical line angle data may be calculated individually for the object and the background based on the direction of the optical line through each pixel. Also, instead of the angle, a different type of data from which the angle can be identified, such as inner product, may be used.

Figure 8:
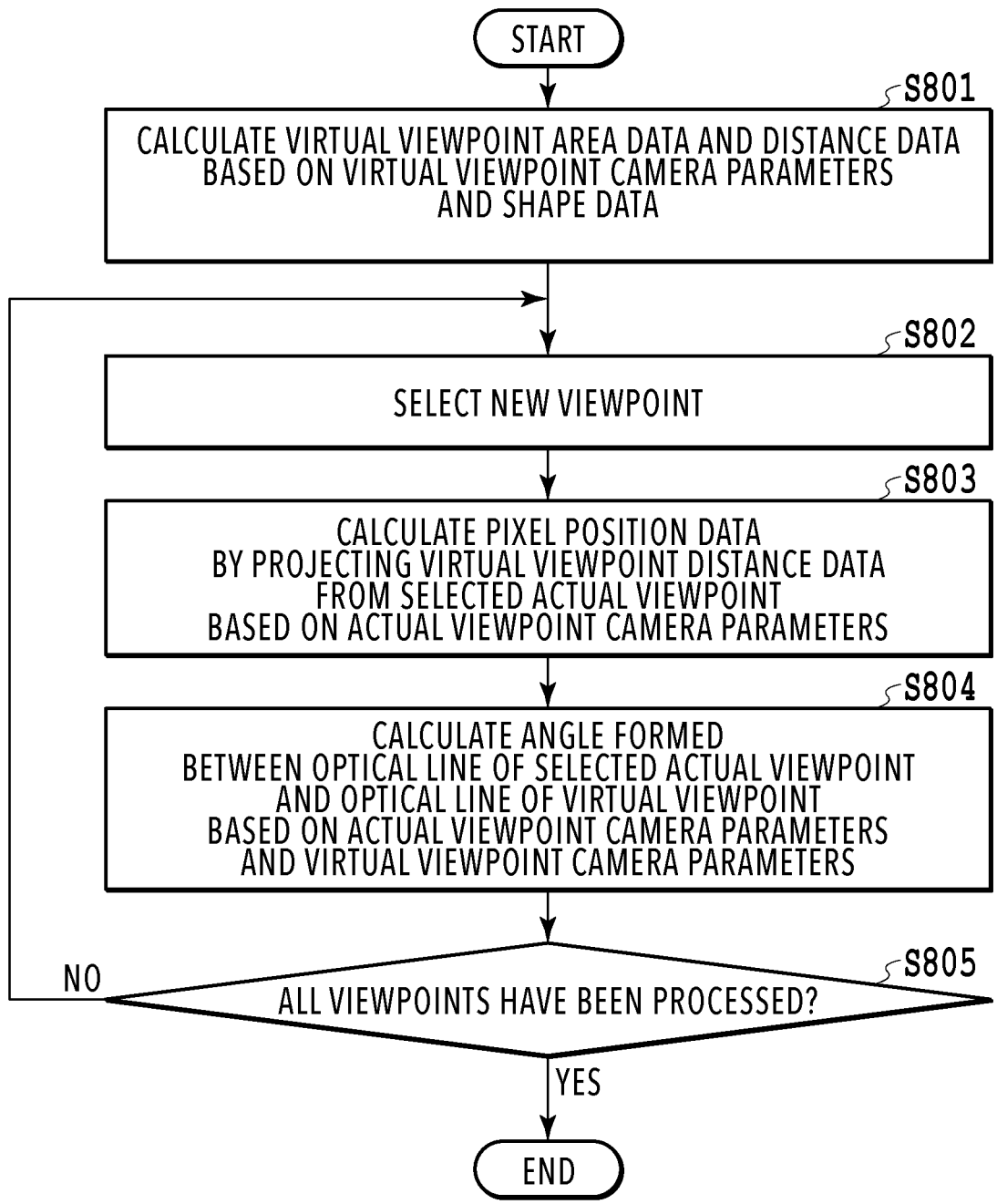
FIG. 8 is a flowchart illustrating an example of the flow of processing by the correspondence calculating unit.

FIG. 8 is a flowchart illustrating an example of the flow of the processing by the correspondence calculating unit 306.

In S801, the virtual viewpoint distance data calculating unit 701 calculates area data and distance data based on the virtual viewpoint camera parameters and the shape data.

In S802, the correspondence calculating unit 306 newly selects one actual viewpoint as a processing target viewpoint from among n actual viewpoints. n is a natural number larger than or equal to 2.

In S803, the projective transformation unit 702 calculates pixel position data based on the distance data and the actual viewpoint camera parameters. Specifically, the projective transformation unit 702 calculates the pixel position data by projecting the virtual viewpoint distance data from the actual viewpoint thus selected (hereinafter, referred to as "selected actual viewpoint") based on the actual viewpoint camera parameters of the selected actual viewpoint.

In S804, the optical line calculating unit 703 calculates optical line angle data indicating the angle formed between the optical line of the selected actual viewpoint and the optical line of the virtual viewpoint based on the actual viewpoint camera parameters of the selected actual viewpoint and the virtual viewpoint camera parameters.

In S805, the correspondence calculating unit 306 determines whether all of the n actual viewpoints have been processed. In a case where not all viewpoints have been processed, the flow returns to S802 and the processes of S802 to S805 are repeated. In a case where all viewpoints have been processed, the processing by the correspondence calculating unit 306 will be terminated.

Note that the correspondence calculation method described here is a mere example, and any other methods may be used. The correspondence may be calculated as projective transformation performed on a polygon-by-polygon basis. Also, explicit pixel position data may not be generated. Instead, pixel position data may be calculated each time it is needed by the virtual viewpoint image combining unit 308.

<Configuration of Shield Determination Unit and Flow of its Processing>

Figure 9:
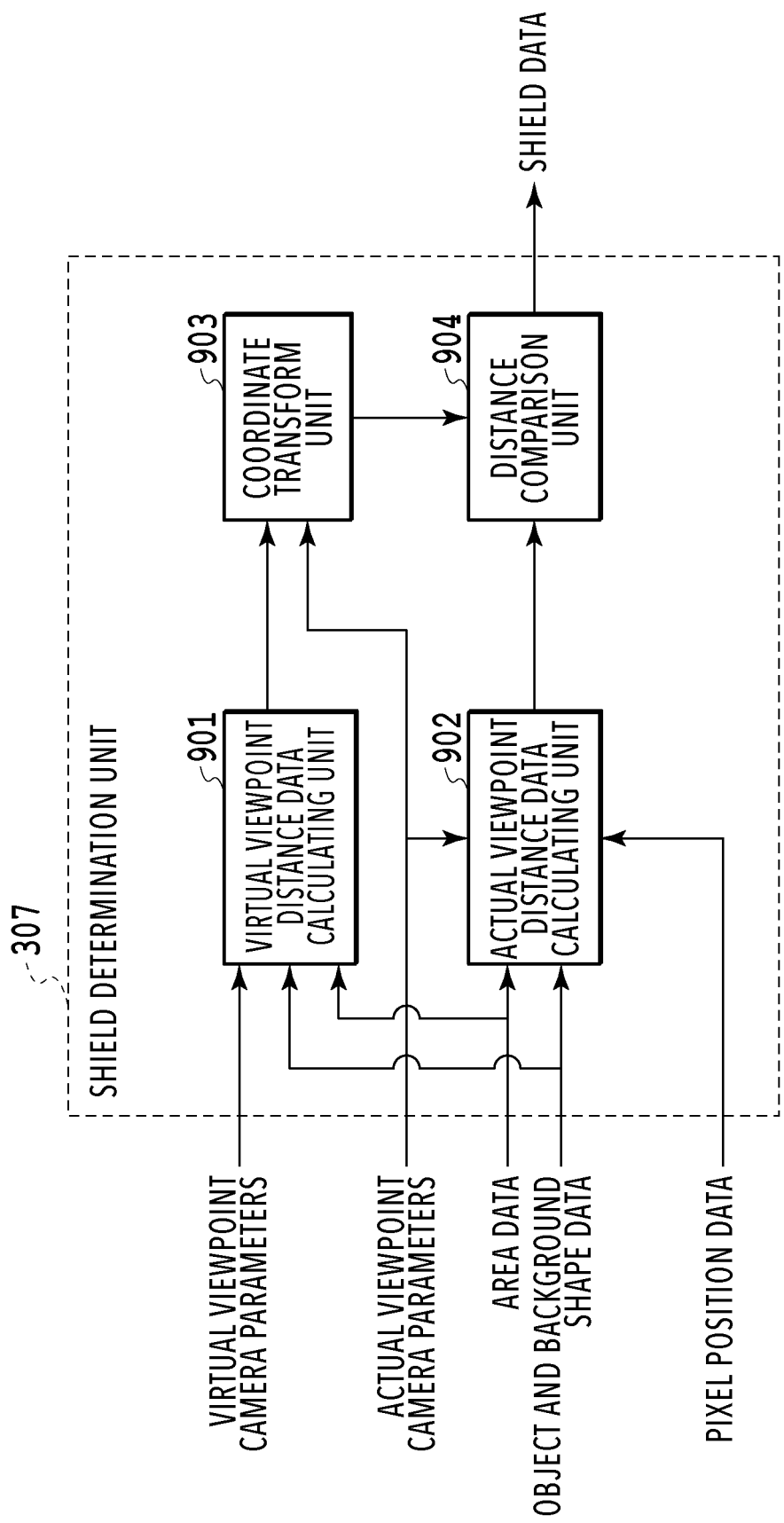
FIG. 9 is a block diagram illustrating an example of the configuration of a shield determination unit of the image processing apparatus.

FIG. 9 is a block diagram illustrating an example of the configuration of the shield determination unit 307.

The shield determination unit 307 includes a virtual viewpoint distance data calculating unit 901, an actual viewpoint distance data calculating unit 902, a coordinate transform unit 903, and a distance comparison unit 904.

The virtual viewpoint distance data calculating unit 901 calculates virtual viewpoint distance data based on the virtual viewpoint camera parameters, the shape data, and the area data. As the shape data and the area data, the object shape data and the object area data are used for calculation of shield data for the object, and the background shape data and the background area data are used for calculation of shield data for the background. The virtual viewpoint distance data calculating unit 901 calculates the virtual viewpoint distance data like the virtual viewpoint distance data calculating unit 701 of the correspondence calculating unit 306 does. The virtual viewpoint distance data calculating unit 901 may be configured to use the distance data calculated by the correspondence calculating unit 306. Note that using the area data in addition to the virtual viewpoint camera parameters and the shape data is preferred since it limits the range of the virtual viewpoint distance data calculation to a smaller range than that in the case of using the virtual viewpoint camera parameters and the shape data, and therefore reduces the calculation cost.

The actual viewpoint distance data calculating unit 902 calculates actual viewpoint distance data based on the actual viewpoint camera parameters, the object shape data, the area data, and the pixel position data. As the pixel position data and the area data, the object pixel position data and the object area data are used for calculation of shield data for the object, and the background pixel position data and the background area data are used for calculation of shield data for the background. As for the shape data, only the object shape data is used since the shielding by the object will be a problem for both the calculation of shield data for the object and the calculation of shield data for the background. The actual viewpoint distance data is distance data of the pixel positions of each actual viewpoint indicated by the pixel position data, and the actual viewpoint distance data calculating unit 902 calculates it by, for example, resampling the distance data calculated for the actual viewpoint based on the pixel position data, like the virtual viewpoint distance data calculating unit 901 does. Alternatively, the actual viewpoint distance data calculating unit 902 may be configured to directly calculate distance data for each corresponding pixel position.

The coordinate transform unit 903 transforms the virtual viewpoint distance data into the coordinate system of the actual viewpoint distance data based on the actual viewpoint camera parameters. The distance of the pixel of interest (u', v') is d'. The intrinsic parameter matrix of the virtual viewpoint is A', and the extrinsic parameter matrix of the virtual viewpoint is [R' T']. The intrinsic parameter matrix of the n-th actual viewpoint among the plurality of actual viewpoints is $A_n$, and the extrinsic parameter matrix is [$R_n$ $T_n$]. Distance data d transformed for the n-th actual viewpoint is calculated from equation 2. R' and $R_n$ represent rotation matrices. T' and $T_n$ represent translation vectors.

$$d \begin{pmatrix} x \\ y \\ 1 \end{pmatrix} = R_n \left( d' R'^t A'^{-1} \begin{pmatrix} u' \\ v' \\ 1 \end{pmatrix} - R'^t T' \right) + T_n \quad (2)$$

The distance comparison unit 904 compares the distance in the actual viewpoint distance data and the distance in the transformed virtual viewpoint distance data on a pixel-by-pixel basis to thereby generate shield data. In a case where the difference in distance is larger than or equal to a given threshold, the distance comparison unit 904 determines that the area is a shielded area.

Figure 10:
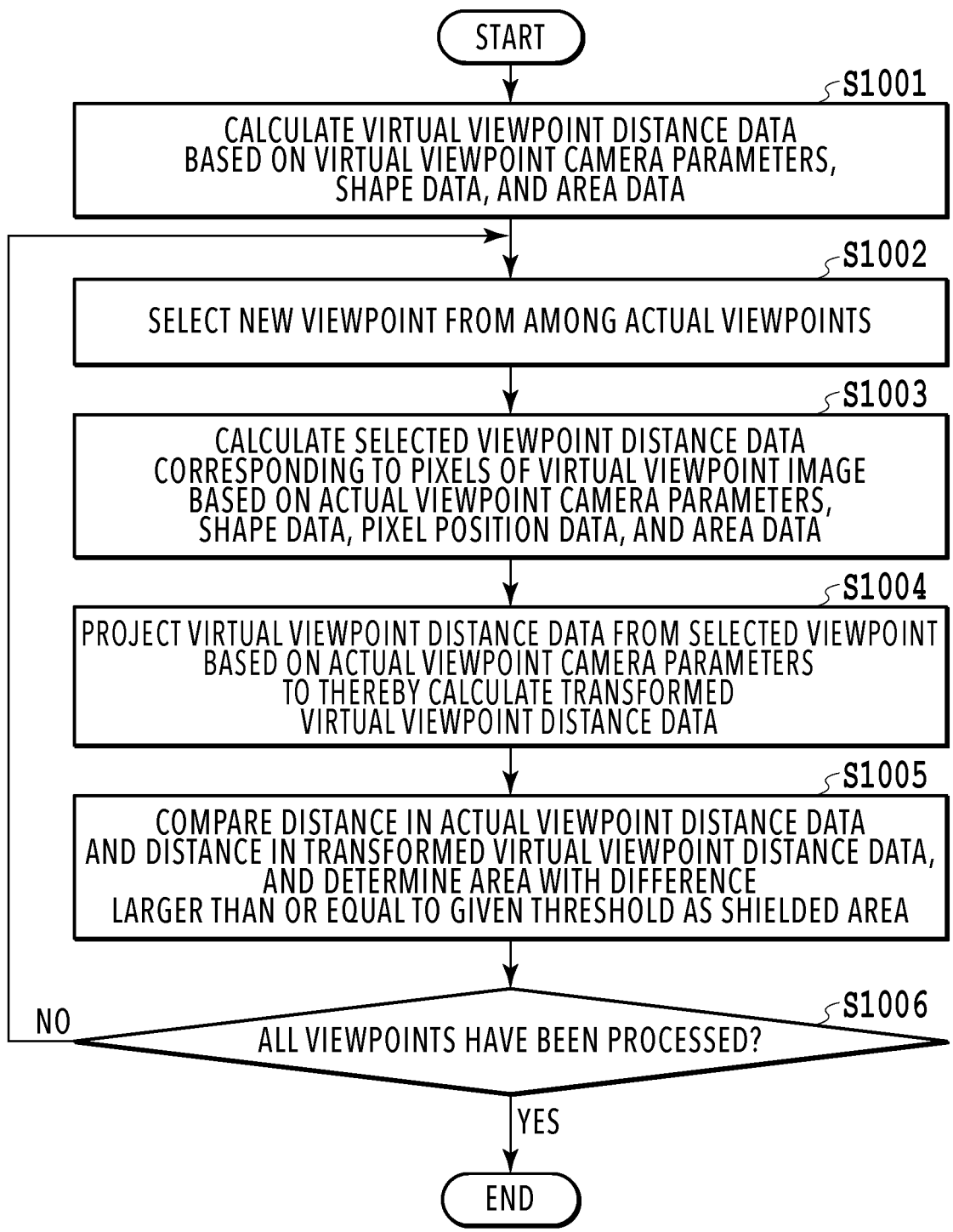
FIG. 10 is a flowchart illustrating an example of the flow of processing by the shield determination unit.

FIG. 10 is a flowchart illustrating an example of the flow of the processing by the shield determination unit 307.

In S1001, the virtual viewpoint distance data calculating unit 901 calculates virtual viewpoint distance data based on the virtual viewpoint camera parameters, the shape data, and the area data.

In S1002, the shield determination unit 307 newly selects one actual viewpoint as a processing target viewpoint from among the n actual viewpoints. n is a natural number larger than or equal to 2.

In S1003, the actual viewpoint distance data calculating unit 902 calculates actual viewpoint distance data based on the actual viewpoint camera parameters of the selected actual viewpoint, the object shape data, the pixel position data, and the object area data. Specifically, the actual viewpoint distance data calculating unit 902 calculates actual viewpoint distance data of the selected actual viewpoint corresponding to the pixels of the virtual viewpoint image.

In S1004, the coordinate transform unit 903 transforms the virtual viewpoint distance data into the coordinate system of the actual viewpoint distance data based on the actual viewpoint camera parameters of the selected actual viewpoint. Specifically, the coordinate transform unit 903 projects the virtual viewpoint distance data from the selected actual viewpoint to thereby calculate transformed virtual viewpoint distance data.

In S1005, the distance comparison unit 904 compares the distance in the actual viewpoint distance data and the distance in the transformed virtual viewpoint distance data on a pixel-by-pixel basis to thereby generate shield data. In a case where the difference in distance is larger than or equal to a given threshold, the distance comparison unit 904 determines that the area is a shielded area.

In S1006, the shield determination unit 307 determines whether all of the n actual viewpoints have been processed. In a case where not all viewpoints have been processed, the flow returns to S1002 and the processes of S1002 to S1006 are repeated. In a case where all viewpoints have been processed, the processing by the shield determination unit 307 is terminated.

Note that the shield determination method described here is a mere example, and any other methods may be used. A determination may be made without explicitly generating distance data, or a determination may be made on a point group basis.

<Configuration of Virtual Viewpoint Image Combining Unit and Flow of its Processing>

Figure 11:
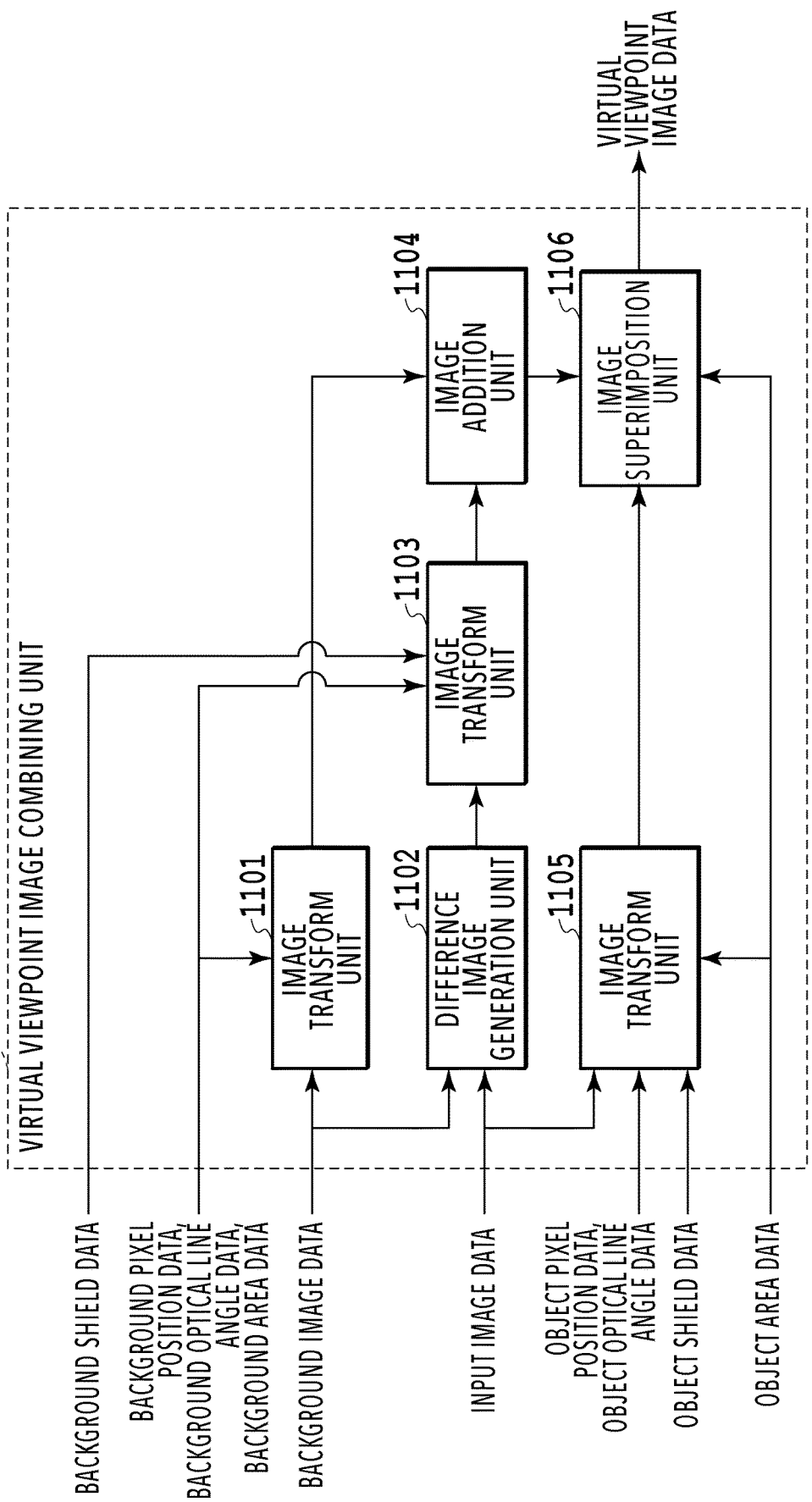
FIG. 11 is a block diagram illustrating an example of the configuration of a virtual viewpoint image combining unit of the image processing apparatus.

FIG. 11 is a block diagram illustrating an example of the configuration of the virtual viewpoint image combining unit 308.

The virtual viewpoint image combining unit 308 includes an image transform unit 1101, a difference image generation unit 1102, an image transform unit 1103, an image addition unit 1104, an image transform unit 1105, and an image superimposition unit 1106.

The image transform unit 1101 transforms background image data based on the background pixel position data, the background optical line angle data, and the background area data. Specifically, the image transform unit 1101 has a function of calculating the pixel value of an image as a multi-viewpoint image viewed from the virtual viewpoint without the shielding by the object taken into consideration. Details will be described later.

The difference image generation unit 1102 generates difference image data from the input image data and the background image data. Details will be described later.

The image transform unit 1103 transforms the difference image data based on the background pixel position data, the background area data, and the background shield data. Specifically, the image transform unit 1103 has a function of calculating the pixel value of an image as a multi-viewpoint image viewed from the virtual viewpoint with the shielding by the object taken into consideration. Details will be described later.

The image addition unit 1104 adds the transformed difference image data to the transformed background image data to thereby generate background virtual viewpoint image data.

The image transform unit 1105 transforms input image data based on the object pixel position data, the object area data, and the object shield data to thereby generate object virtual viewpoint image data. Specifically, the image transform unit 1105 has a function of calculating the pixel value of an image as a multi-viewpoint image viewed from the virtual viewpoint with the shielding by the object taken into consideration. Details will be described later.

The image superimposition unit 1106 superimposes the object virtual viewpoint image data onto the background virtual viewpoint image data based on the object area data to thereby generate virtual viewpoint image data. The virtual viewpoint image data is calculated from $M_f \cdot G_f \ (1-M_f) \cdot M_b \cdot G_b$, where $G_b$ is the background virtual viewpoint image data, $G_f$ is the object virtual viewpoint image data, $M_b$ is the background area data, and $M_f$ is the object area data.

Figure 12:
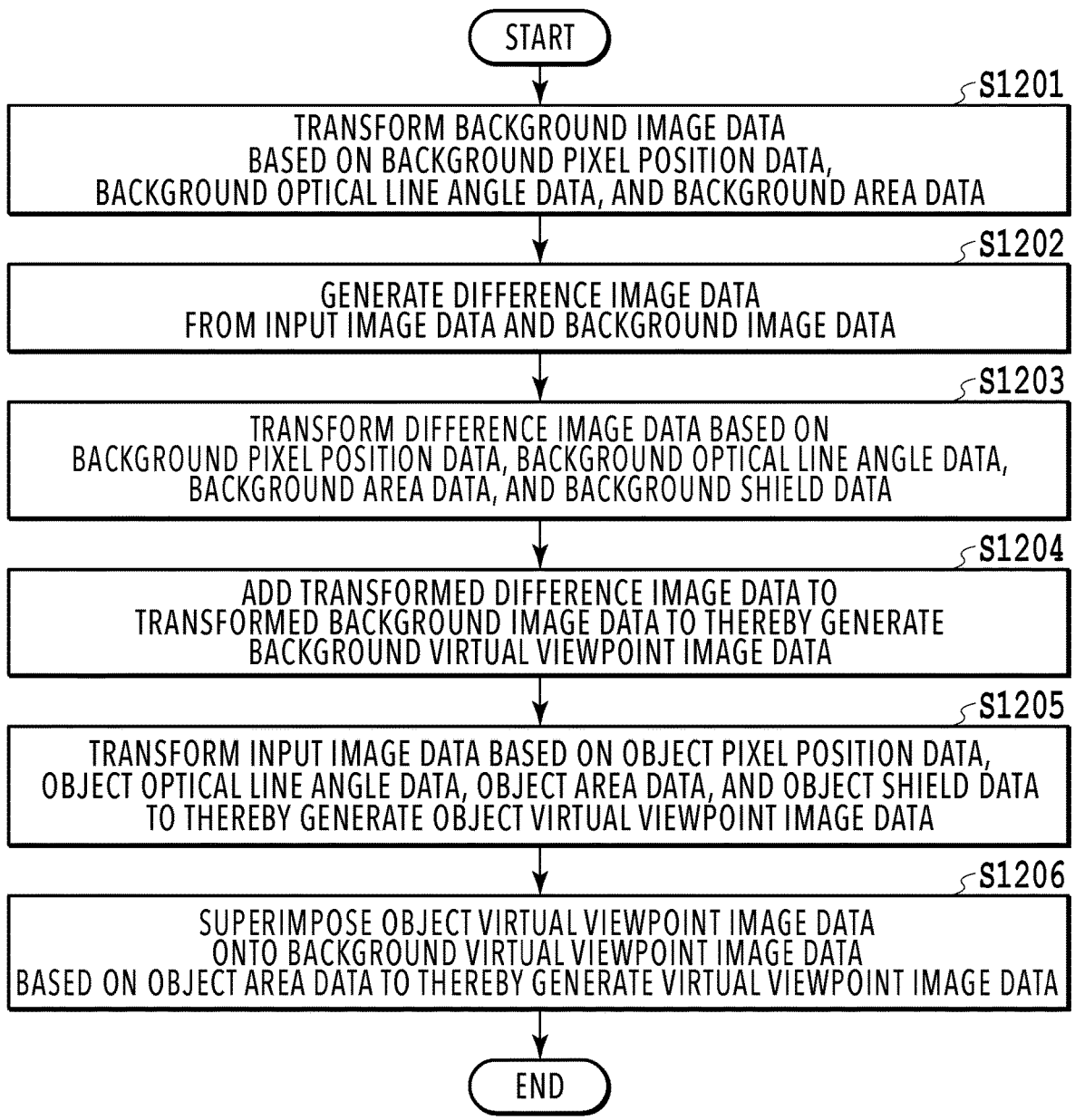
FIG. 12 is a flowchart illustrating an example of the flow of processing by the virtual viewpoint image combining unit.

FIG. 12 is a flowchart illustrating an example of the flow of the processing by the virtual viewpoint image combining unit 308.

In S1201, the image transform unit 1101 transforms background image data based on the background pixel position data, the background optical line angle data, and the background area data. Specifically, the image transform unit 1101 calculates background pixel value as the pixel value of an image viewed from the virtual viewpoint from an image with no object therein.

In S1202, the difference image generation unit 1102 generates difference image data from the input image data and the background image data. Specifically, the difference image generation unit 1102 generates a difference image between a multi-viewpoint image with the object therein and a multi-viewpoint image without the object therein.

In S1203, the image transform unit 1103 transforms the difference image data based on the background pixel position data, the background optical line angle data, the background area data, and the background shield data. Specifically, the image transform unit 1103 calculates difference pixel value of the view from the virtual viewpoint from the difference image data.

In S1204, the image addition unit 1104 adds the transformed difference image data to the transformed background image data to thereby generate background virtual viewpoint image data. Specifically, the image addition unit 1104 generates the combined background virtual viewpoint image data based on the pixel value calculated by the image transform unit 1103 and the pixel value calculated by the image transform unit 1101.

In S1205, the image transform unit 1105 transforms input image data based on the object pixel position data, the object optical line angle data, the object area data, and the object shield data to thereby generate object virtual viewpoint image data. Specifically, the image transform unit 1105 calculates object pixel value of the view from the virtual viewpoint from the multi-viewpoint image with the object therein.

In S1206, the image superimposition unit 1106 superimposes the object virtual viewpoint image data onto the background virtual viewpoint image data based on the object area data to thereby generate virtual viewpoint image data.

Note that in a case where the area where the object is present can be limited in advance, the region in the background area data to be used for the image transform of the difference image data may be limited to achieve a reduction in calculation cost and so on.

<Configuration of Difference Image Generation Unit and Flow of its Processing>

Figure 13:
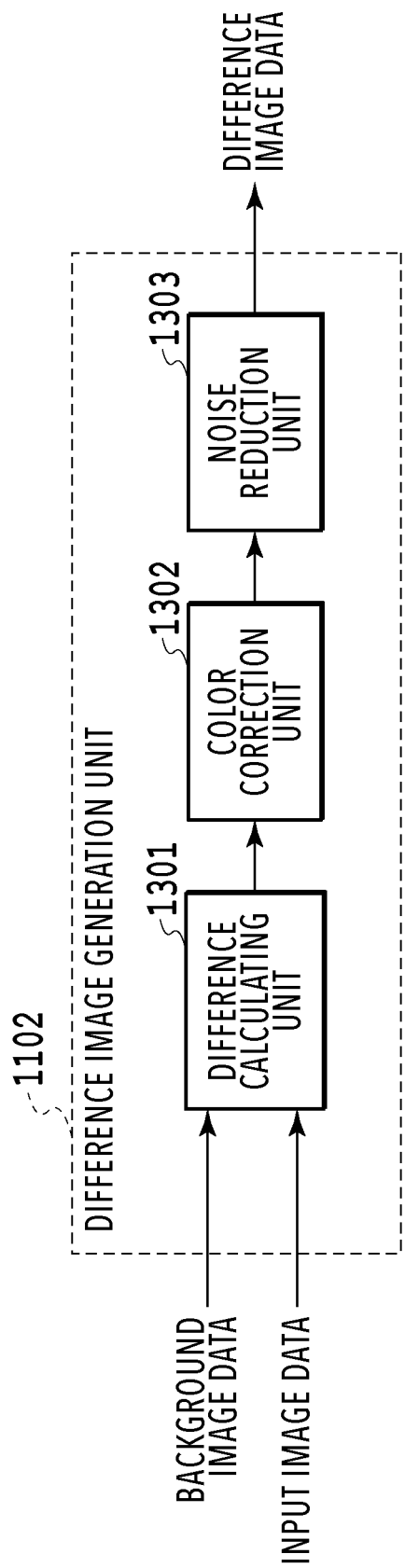
FIG. 13 is a block diagram illustrating an example of the configuration of a difference image generation unit of the image processing apparatus.

FIG. 13 is a block diagram illustrating an example of the configuration of the difference image generation unit 1102.

The difference image generation unit 1102 includes a difference calculating unit 1301, a color correction unit 1302, and a noise reduction unit 1303.

The difference calculating unit 1301 calculates difference image data by subtracting the pixel values of the pixels in the background image data from the pixel values of the pixels in the input image data.

The color correction unit 1302 performs color correction on the difference image data. The color correction includes a process of lowering the saturation of the difference pixel value in the difference image data to below a predetermined threshold, a process of performing clipping with an upper limit provided, and so on. Since the difference image data is mainly a shadow component, this process can suppress the occurrence of unintended coloring and the like. Note that this process does not necessarily have to be performed.

The noise reduction unit 1303 performs a noise reduction process on the difference pixel value in the color-corrected difference image data. The noise reduction process is a filter process with an average filter, a bilateral filter, or the like. Since the difference image data is mainly a shadow component and the amount of high frequency components therein is small, this process can effectively reduce only noise. Note that this process does not necessarily have to be performed.

Figure 14:
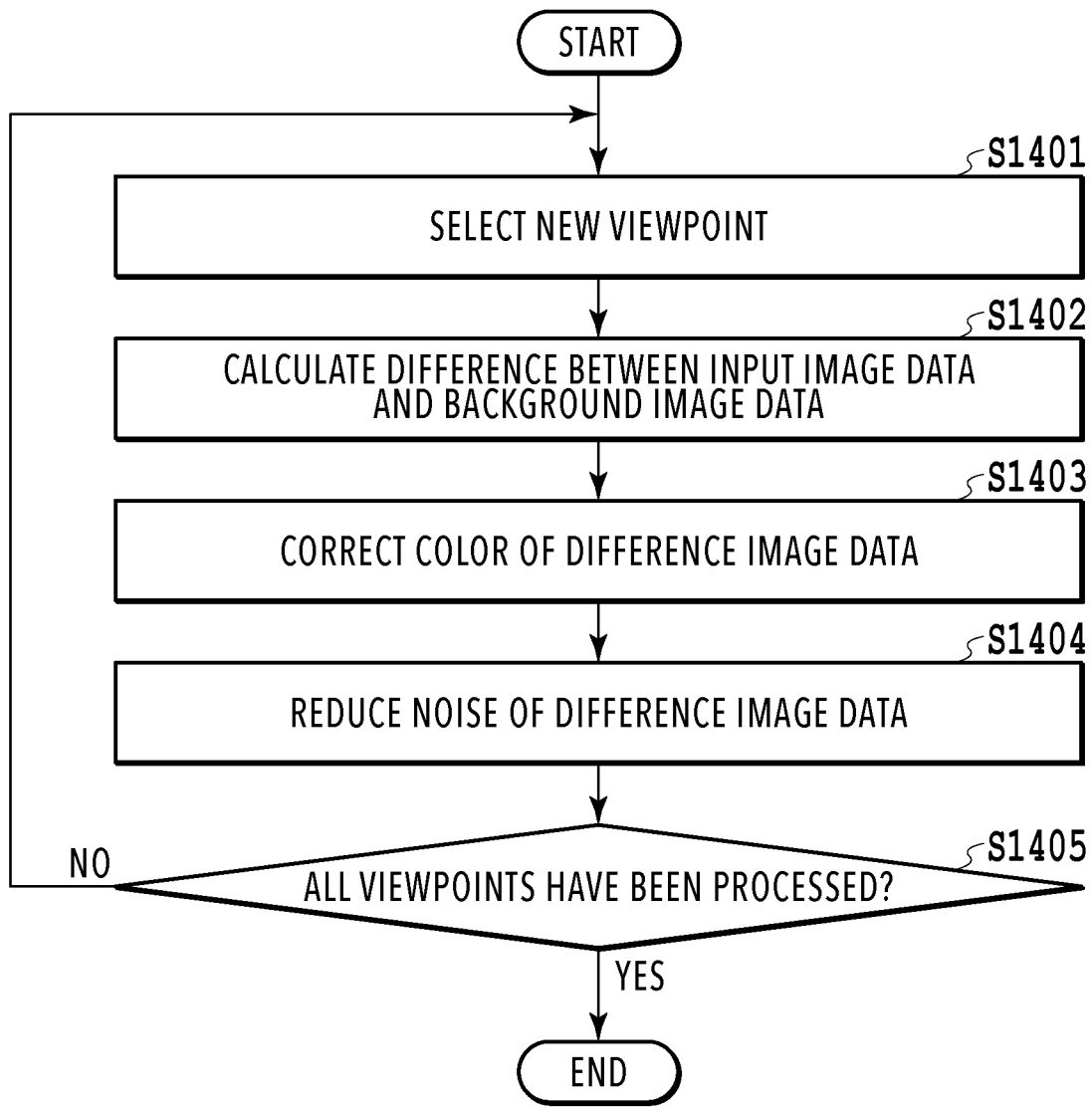
FIG. 14 is a flowchart illustrating an example of the flow of processing by the difference image generation unit.

FIG. 14 is a flowchart illustrating an example of the flow of the processing by the difference image generation unit 1102.

In S1401, the difference image generation unit 1102 newly selects one actual viewpoint as a processing target viewpoint from among the n actual viewpoints. n is a natural number larger than or equal to 2.

In S1402, the difference calculating unit 1301 calculates difference image data by subtracting the pixel values of the pixels in the background image data from the pixel values of the pixels in the input image data.

In S1403, the color correction unit 1302 performs the color correction on the difference image data.

In S1404, the noise reduction unit 1303 performs the noise reduction process on the color-corrected difference image data.

In S1405, the difference image generation unit 1102 determines whether all of the n actual viewpoints have been processed. In a case where not all viewpoints have been processed, the flow returns to S1401 and the processes of S1401 to S1405 are repeated. In a case where all viewpoints have been processed, the processing by the difference image generation unit 1102 is terminated.

<Configuration of Image Transform Unit and Flow of its Processing>

Figure 15:
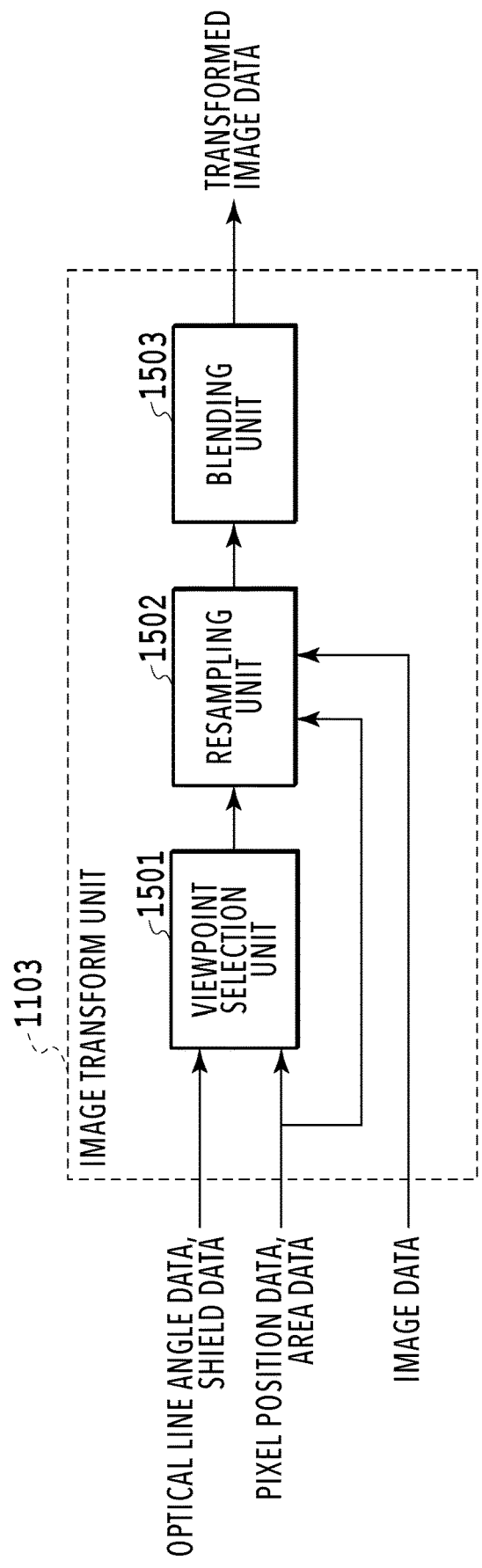
FIG. 15 is a block diagram illustrating an example of the configuration of an image transform unit of the image processing apparatus.

FIG. 15 is a block diagram illustrating an example of the configuration of the image transform unit 1103.

The image transform unit 1103 includes a viewpoint selection unit 1501, a resampling unit 1502, and a blending unit 1503.

The viewpoint selection unit 1501 selects viewpoints to be used for pixel value calculation for each pixel of the image data based on the pixel position data, the optical line angle data, the area data, and the shield data. The viewpoint selection unit 1501 performs the process only for the pixels defined as the processing targets in the area data. In the viewpoint selection, the viewpoint selection unit 1501 selects the viewpoints with the smallest positive and negative optical line angles among candidates defined as visible in the shield data and having the corresponding pixel positions in the pixel position data situated within the image data.

The resampling unit 1502 resamples the image data from each selected viewpoint based on the pixel position data and the area data to thereby calculate pixel values. For the resampling, any method may be used, such as the nearest neighbor method or linear interpolation. Specifically, the resampling unit 1502 has a function of, based on distance information on the view from the virtual viewpoint, calculating correspondences to a multi-viewpoint image and sampling the multi-viewpoint image based on the correspondences.

The blending unit 1503 blends the resampled pixel values to thereby generate transformed image data. Each blended pixel value is calculated from $(I_0 \cdot |\theta_1| + I_1 \cdot |\theta_0|)/(|\theta_0|+|\theta_0|)$, where $\theta_0$ and $\theta_1$ are the optical line angles of the two selected viewpoints, and $I_0$ and $I_1$ are the resampled pixel value. Note that the blending may be performed by a calculation based on a different equation.

Figure 16:
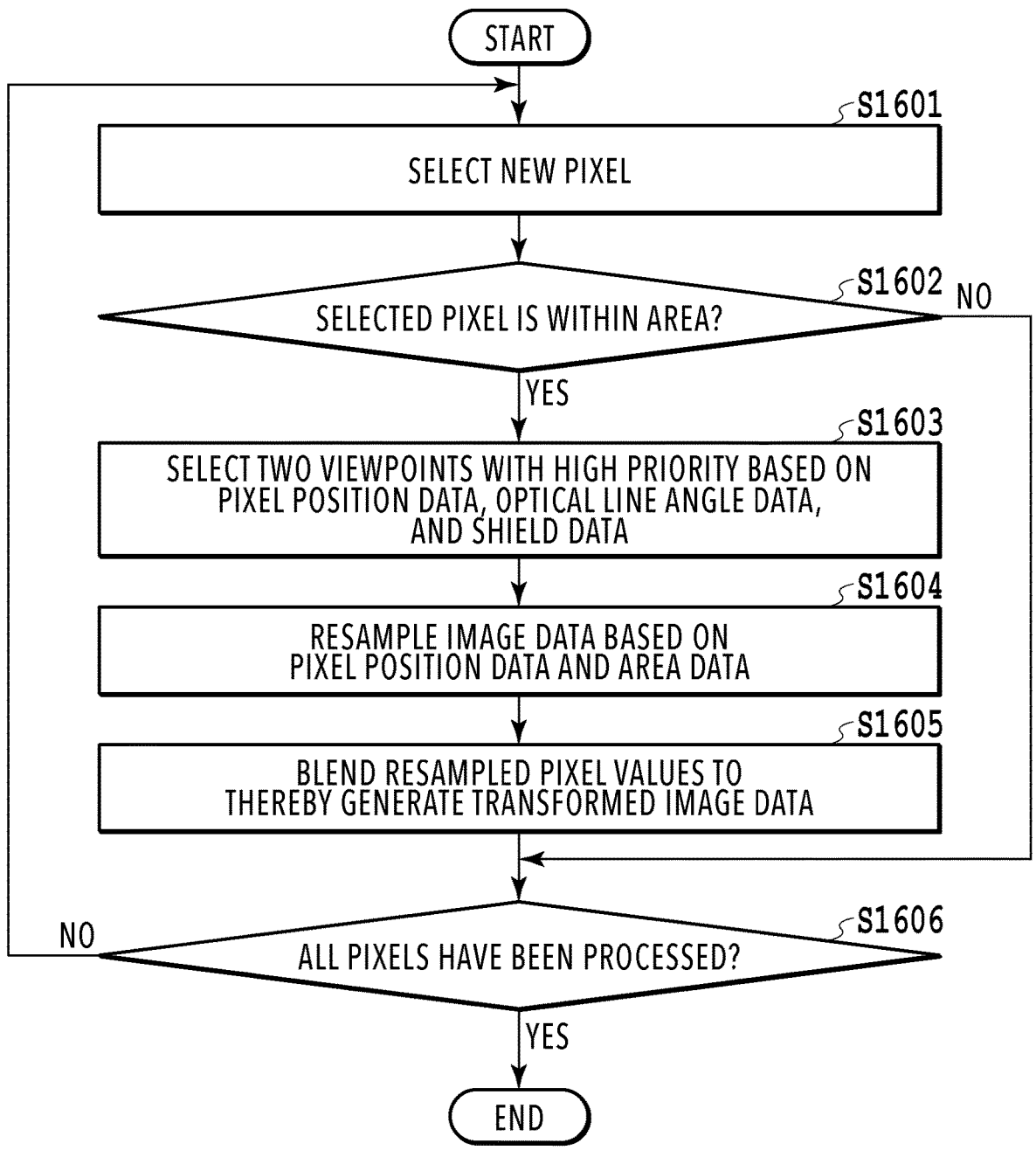
FIG. 16 is a flowchart illustrating an example of the flow of processing by the image transform unit.

FIG. 16 is a flowchart illustrating an example of the flow of the processing by the image transform unit 1103.

In S1601, the image transform unit 1103 newly selects a processing target pixel.

In S1602, the viewpoint selection unit 1501 determines based on the area data whether the pixel selected in S1601 is within the processing area. The flow proceeds to S1603 in a case where the pixel is within the processing area, whereas the flow proceeds to S1606 in a case where the pixel is outside the processing area.

In S1603, the viewpoint selection unit 1501 selects viewpoints to be used for pixel value calculation for each pixel of the image data based on the shield data, the pixel position data, and the optical line angle data.

In S1604, the resampling unit 1502 resamples the image data from each selected viewpoint based on the pixel position data and the area data to thereby calculate pixel value. According to S1602 to S1604, the image transform unit 1103 does not perform the resampling in a case where determining that the pixel is a shielded area based on the shield data, which indicates consistency between distance information on the view from the virtual viewpoint and distance information on the views from the viewpoints of the multi-viewpoint image.

In S1605, the blending unit 1503 blends the resampled pixel values to thereby generate transformed image data.

In S1606, the viewpoint selection unit 1501 determines whether all pixels have been processed. In a case where not all pixels have been processed, the flow returns to S1601 and the processes of S1601 to S1606 are repeated. In a case where all pixels have been processed, the processing by the image transform unit 1103 is terminated.

Note that the image transform method described here is a mere example, and any other methods may be used. For example, the pieces of image data from all unshielded viewpoints may be resampled without the optical line angles taken into consideration and averaged to calculate the pixel value. Also, three or more viewpoints may be used to perform blending based on the optical line angles. Also, blending based on the distance from the shielded area or an image edge may be performed. Also, for the generation of the object virtual viewpoint image data by the image transform unit 1105, any method may be used as long as it is a method of generating an object virtual viewpoint image. For example, a method that does not use the object shape, such as a billboard method, may be used.

Also, in this embodiment, the difference between input image data and background image data is calculated to generate difference image data, and the difference image data and background image data are transformed for the virtual viewpoint and then the sum of them is calculated to generate background virtual viewpoint image data. However, the differences and the sum do not necessarily have to be used. For example, instead of calculating the difference between input image data and background image data, the ratio between them may be calculated, and the input image data and background image data may be transformed for the virtual viewpoint and then multiplied by the ratio. Also, an exponential function or the like may be applied to the absolute value of the difference, and the absolute value may be transformed for the virtual viewpoint and then objected to inverse transform.

While the processing by the image transform unit 1103 has been described here, the description applies similarly to the image transform unit 1105. Also, the processing by the image transform unit 1101, which does not use the shield data, may be performed in a similar manner on the assumption that there is no shielding.

The above is the content of the processing by the image processing apparatus 102 in this embodiment for generating a virtual viewpoint image. The virtual viewpoint image combining unit 308 generates a combined virtual viewpoint image as the sum of pixel value calculated from a multi-viewpoint image with an object therein, a multi-viewpoint image without the object therein, and a difference image thereof with the shielding taken into consideration, and pixel value calculated from these without the shielding taken into consideration. It is therefore possible to generate a virtual viewpoint image in which visual oddness caused by an area shielded by an object is reduced.

Embodiment 2

Figure 17:
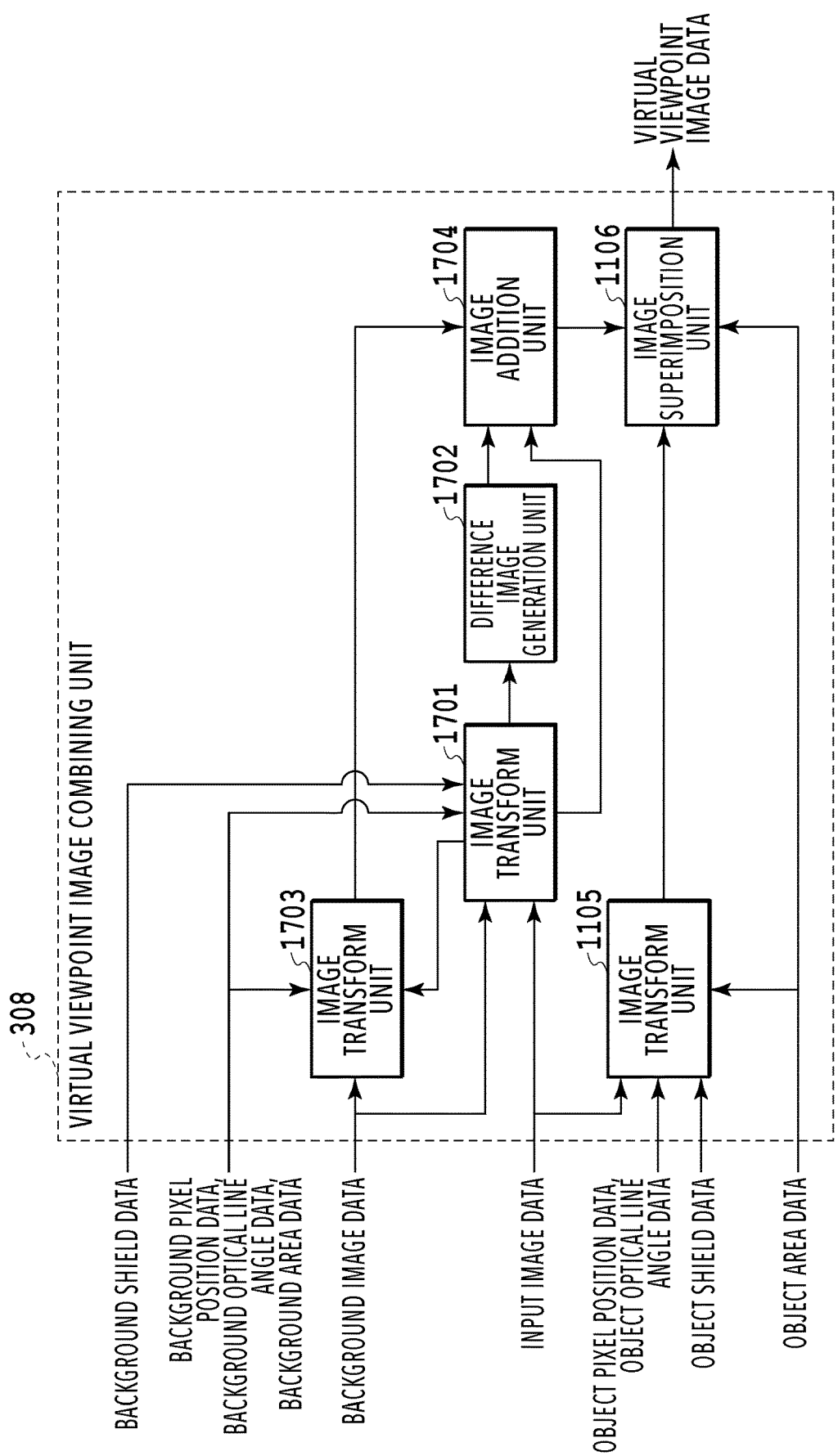
FIG. 17 is a block diagram illustrating an example of the configuration of a virtual viewpoint image combining unit of an image processing apparatus according to embodiment 2.

In this embodiment, an example will be presented in which the virtual viewpoint image combining unit 308 performs processes in a sequence different from embodiment 1. FIG. 17 is a block diagram illustrating an example of the configuration of the virtual viewpoint image combining unit 308 in embodiment 2.

The virtual viewpoint image combining unit 308 includes an image transform unit 1701, a difference image generation unit 1702, an image transform unit 1703, an image addition unit 1704, the image transform unit 1105, and the image superimposition unit 1106.

In this embodiment, unlike embodiment 1, the image transform unit 1701 transforms input image data and background image data and then the difference image generation unit 1702 generates transformed difference image data.

In addition to the transformed image data, the image transform unit 1701 calculates shielded area data storing information indicating whether the selected viewpoints have been changed due to shielding, for each pixel of the virtual viewpoint image data. Specifically, the shielded area data relates to shield data indicating, for each pixel of the virtual viewpoint image data, whether the point on the background seen at the pixel of interest is not seen from the actual viewpoints, and is data corresponding to all pixels of the virtual viewpoint image.

The image transform unit 1701 and the image transform unit 1703 perform their background image data transform only at an area affected by shielding, based on the shielded area data.

The image addition unit 1704 performs a process of replacing with the sum of the output image data of the image transform unit 1703 and the output image data of the difference image generation unit 1702, on the input image data transformed by the image transform unit 1701 only at the area affected by shielding. The other features of the configuration are similar to embodiment 1.

Figure 18:
FIG. 18 is a flowchart illustrating an example of the flow of processing by the virtual viewpoint image combining unit.

FIG. 18 is a flowchart illustrating an example of the flow of the processing by the virtual viewpoint image combining unit 308 in embodiment 2.

In S1801, the image transform unit 1701 calculates shielded area data based on the background area data, the background optical line angle data, and the background shield data.

In S1802, the image transform unit 1701 transforms the background image data based on the background pixel position data, the background optical line angle data, the background area data, the background shield data, and the shielded area data.

In S1803, the image transform unit 1701 transforms the input image data based on the background pixel position data, the background optical line angle data, the background area data, the background shield data, and the shielded area data.

In S1804, the difference image generation unit 1702 generates difference image data from the transformed input image data and background image data based on the shielded area data.

In S1805, the image transform unit 1703 transforms background image data based on the background pixel position data, the background optical line angle data, the background area data, and the shielded area data.

In S1806, the image addition unit 1704 adds the transformed background image data to the transformed difference image data based on the shielded area data.

Then, based on the pieces of object correspondence data and the object shield data, input image data is transformed to generate object virtual viewpoint image data (S1205). Then, based on the object area data, the object virtual viewpoint image data is superimposed onto the background virtual viewpoint image data to generate virtual viewpoint image data (S1206).

The above is the content of the processing by the virtual viewpoint image combining unit 308 in this embodiment for generating virtual viewpoint image data. Even in the case of replacing with the sum of the output image of the image transform unit 1703 and the output image of the difference image generation unit 1702 only at the area affected by shielding based on the shielded area data, it is possible to generate a virtual viewpoint image in which visual oddness caused by an area shielded by an object is reduced.

In this embodiment, the limiting of the processing region based on the shielded area data is performed in order to reduce the calculation cost. Note, however, that this processing may not be performed and image transform may be performed on the assumption that entire area is affected by shielding. Also, the virtual viewpoint image combining unit 308 may be configured to perform the processing sequentially for the individual pixels of the virtual viewpoint image.

Also, this embodiment involves identifying the shielded area and generating a virtual viewpoint image in which visual oddness caused by the shielded area is reduced. However, the area to which the above-described image processing is applicable is not limited to the shielded area. For example, areas in the virtual viewpoint image for which images captured by a plurality of image capturing apparatuses are to be used for texture mapping may be identified, and the image processing described in the above embodiment may be performed on these areas.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above-described embodiments, it is possible to generate a virtual viewpoint image in which visual oddness caused by the difference in color between captured images obtained by a plurality of image capturing apparatuses is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-186771 filed Sep. 27, 2017, which is hereby incorporated by reference wherein in its entirety.

What is claimed is:
1. An image processing apparatus comprising:
one or more hardware processors; and
one or more memories which store instructions executable by the one or more hardware processors to cause the image processing apparatus to perform at least:

obtaining images based on image capturing by a plurality of image capturing apparatuses that capture images of an image capturing target area from different directions;

obtaining viewpoint information indicating a position and an orientation of a virtual viewpoint;

determining a pixel value of a specific area in a virtual viewpoint image corresponding to the position and the orientation of the virtual viewpoint at a first time indicated by the obtained viewpoint information, based on both a pixel value of an obtained image based on image capturing at a second time, which is different from the first time, by a first image capturing apparatus among the plurality of image capturing apparatuses and a pixel value of an obtained image based on image capturing at the first time by a second image capturing apparatus, which is different from the first image capturing apparatus, among the plurality of image capturing apparatuses, wherein an image of the specific area is not captured by the first image capturing apparatus at the first time; and generating the virtual viewpoint image in accordance with the determining of the pixel value of the specific area.

2. The image processing apparatus according to claim 1, wherein an image capturing range of the first image capturing apparatus and an image capturing range of the second image capturing apparatus at the first time cover a predetermined object, and the image capturing range of the first image capturing apparatus at the second time does not cover the predetermined object, and wherein the specific area is an area not covering the predetermined object.

3. The image processing apparatus according to claim 2, wherein the predetermined object is any one of a person and a ball.

4. The image processing apparatus according to claim 2, wherein the specific area is an area covering a shadow of the predetermined object.

5. The image processing apparatus according to claim 2, wherein the pixel value of the specific area in the virtual viewpoint image corresponding to the virtual viewpoint at the first time is determined based on the pixel value of the image based on the image capturing by the first image capturing apparatus at the second time, the pixel value of the image based on the image capturing by the second image capturing apparatus at the first time, and a pixel value of an image based on image capturing by the second image capturing apparatus at a third time, and wherein the image capturing range of the second image capturing apparatus at the third time does not cover the predetermined object.

6. The image processing apparatus according to claim 5, wherein the instructions further cause the image processing apparatus to perform generating a difference image indicating a difference between the image based on the image capturing by the second image capturing apparatus at the first time and the image based on the image capturing by the second image capturing apparatus at the third time, wherein the pixel value of the specific area in the virtual viewpoint image corresponding to the virtual viewpoint at the first time is determined based on the pixel value of the image based on the image capturing by the first image capturing apparatus at the second time and a pixel value of the generated difference image.

7. The image processing apparatus according to claim 6, wherein the instructions further cause the image processing apparatus to perform processing of at least one of a saturation lowering process and a noise reduction process on the generated difference image, wherein the pixel value of the specific area in the virtual viewpoint image corresponding to the virtual viewpoint at the first time is determined based on the pixel value of the image based on the image capturing by the first image capturing apparatus at the second time and a pixel value of the difference image processed by the processing.

8. The image processing apparatus according to claim 2, wherein a pixel value of a portion of an area in the virtual viewpoint image corresponding to the virtual viewpoint at the first time is determined based on a pixel value of an image based on image capturing by the first image capturing apparatus at the first time, the area not covering the predetermined object, the portion excluding the specific area.

9. The image processing apparatus according to claim 8, wherein a pixel value of an area in the virtual viewpoint image corresponding to the virtual viewpoint at the first time is determined based on a pixel value of one or more images based on image capturing by one or more of the plurality of image capturing apparatuses at the first time, the area corresponding to the predetermined object.

10. The image processing apparatus according to claim 1, wherein the first image capturing apparatus is selected from among the plurality of image capturing apparatuses based on the obtained viewpoint information.

11. The image processing apparatus according to claim 1, wherein the second image capturing apparatus is selected from among the plurality of image capturing apparatuses based on a position of the first image capturing apparatus and a position of a predetermined object within the image capturing target area.

12. An image processing method comprising:

obtaining images based on image capturing by a plurality of image capturing apparatuses that capture images of an image capturing target area from different directions;

obtaining viewpoint information indicating a position and an orientation of a virtual viewpoint;

determining a pixel value of a specific area in a virtual viewpoint image corresponding to the position and the orientation of the virtual viewpoint at a first time indicated by the obtained viewpoint information, based on both a pixel value of an obtained image based on image capturing at a second time, which is different from the first time, by a first image capturing apparatus among the plurality of image capturing apparatuses and a pixel value of an obtained image based on image capturing at the first time by a second image capturing apparatus, which is different from the first image capturing apparatus, among the plurality of image capturing apparatuses, wherein an image of the specific area is not captured by the first image capturing apparatus at the first time; and generating the virtual viewpoint image in accordance with the determining of the pixel value of the specific area.

13. The image processing method according to claim 12, wherein an image capturing range of the first image capturing apparatus and an image capturing range of the second image capturing apparatus at the first time cover a predetermined object, and the image capturing range of the first image capturing apparatus at the second time does not cover the predetermined object, and wherein the specific area is an area not covering the predetermined object.

14. The image processing method according to claim 13, wherein the determining determines the pixel value of the specific area in the virtual viewpoint image corresponding to the virtual viewpoint at the first time based on the pixel value of the image based on the image capturing by the first image capturing apparatus at the second time, the pixel value of the image based on the image capturing by the second image capturing apparatus at the first time, and a pixel value of an image based on image capturing by the second image capturing apparatus at a third time, and wherein the image capturing range of the second image capturing apparatus at the third time does not cover the predetermined object.

15. A non-transitory computer readable storage medium storing a program for causing a computer to execute an image processing method comprising:

obtaining images based on image capturing by a plurality of image capturing apparatuses that capture images of an image capturing target area from different directions;

obtaining viewpoint information indicating a position and an orientation of a virtual viewpoint;

determining a pixel value of a specific area in a virtual viewpoint image corresponding to the position and the orientation of the virtual viewpoint at a first time indicated by the obtained viewpoint information based on both a pixel value of an obtained image based on image capturing at a second time, which is different from the first time, by a first image capturing apparatus among the plurality of image capturing apparatuses and a pixel value of an obtained image based on image capturing at the first time by a second image capturing apparatus, which is different from the first image capturing apparatus, among the plurality of image capturing apparatuses, wherein an image of the specific area is not captured by the first image capturing apparatus at the first time; and generating the virtual viewpoint image in accordance with the determining of the pixel value of the specific area.

* * * * *